US012734497B2

(12) United States Patent
Falc'Hun et al.

(10) Patent No.: US 12,734,497 B2
(45) Date of Patent: Sep. 15, 2026

(54) HIGH AMYLOSE STARCH BASED CAPSULES AND METHOD OF MAKING SAME

(71) Applicant: V. MANE FILS, Le Bar-sur-Loup (FR)

(72) Inventors: Annaïg Falc'Hun, Grasse (FR); Anouk Dignat, Grasse (FR); Jean-Michel Hannetel, Grasse (FR)

(73) Assignee: V. MANE FILS, Le Bar-sur-Loup (FR)

( * ) Notice: Subject to any disclaimer, the term of this patent is extended or adjusted under 35 U.S.C. 154(b) by 1147 days.

(21) Appl. No.: 17/295,216

(22) PCT Filed: Dec. 4, 2019

(86) PCT No.: PCT/EP2019/083686

§ 371 (c)(1),
(2) Date: May 19, 2021

(87) PCT Pub. No.: WO2020/115138

PCT Pub. Date: Jun. 11, 2020

(65) Prior Publication Data

US 2022/0008885 A1 Jan. 13, 2022

(30) Foreign Application Priority Data

Dec. 5, 2018 (FR) ........................................ 1872369

(51) Int. Cl.

| | |
|---|---|
| ***B01J 13/04*** | (2006.01) |
| ***C08B 30/20*** | (2006.01) |
| ***C08B 33/02*** | (2006.01) |

(52) U.S. Cl.

CPC ............. *B01J 13/046* (2013.01); *C08B 30/20* (2013.01); *C08B 33/02* (2013.01)

(58) Field of Classification Search

CPC ........ B01J 13/046; C08B 30/20; C08B 33/02; A61K 2800/622; A61K 8/11; A61K 8/733; A61K 8/737; A61K 2800/43; A61Q 1/02

See application file for complete search history.

(56) References Cited

U.S. PATENT DOCUMENTS

| | | | |
|---|---|---|---|
| 5,795,590 A | 8/1998 | Kiefer et al. | |
| 5,882,680 A | 3/1999 | Suzuki et al. | |
| 6,719,933 B2 | 4/2004 | Nakamura et al. | |
| 7,255,921 B2 | 8/2007 | Kamaguchi et al. | |
| 2004/0191366 A1* | 9/2004 | Mangos .................. | A23L 7/111 426/89 |
| 2005/0196436 A1* | 9/2005 | Chantranukul ...... | A61K 9/4816 426/573 |
| 2009/0208568 A1 | 8/2009 | Hannetel et al. | |
| 2016/0021927 A1 | 1/2016 | Kondo | |
| 2018/0221486 A1* | 8/2018 | Pora ....................... | A61K 9/286 |

FOREIGN PATENT DOCUMENTS

| | | |
|---|---|---|
| EP | 0374359 | 6/1990 |
| EP | 0374359 A2 | 6/1990 |
| WO | WO-1992009274 | 6/1992 |
| WO | 2005/021635 A1 | 3/2005 |
| WO | 2015/071433 A1 | 5/2015 |

OTHER PUBLICATIONS

International Search Report and Written Opinion issued on Jul. 13, 2020 in corresponding application No. PCT/EP2019/083686; 11 pgs.

Examination Report dated Mar. 25, 2024 in Pakistani Application No. 814/2019.

First Examination Report dated Jun. 13, 2022 in Canadian Application No. 3,119,497.

Notice of Allowance dated Jan. 25, 2024 in Canadian Application No. 3,119,497.

First Examination Report dated Jun. 24, 2022 in Indian Application No. 202117024468.

Extended Hearing Notice dated Feb. 14, 2024 in Indian Application No. 202117024468.

Zhu, et al, "Effect of a new shell material—Jackfruit seed starch on novel flavor microcapsules containing vanilla oil", 2018, vol. 112, pp. 47-52, Industrial Crops & Products.

Tran, et al, "Physicochemical properties of native and partially gelatinized high-amylose jackfruit (*Artocarpus heterophyllus* Lam.) seed starch", 2015, pp. 1-8, LWT-Food Science and Technology.

Bordoloi, et al. :Properties, Pharmaceutical Application and Various Technique of Chemical Modification in Native Starch: A Descriptive Review, 2019, vol. 11, issue 4, pp. 54-59, Int J Curr Pharm Res.

Murua-Pagola, et al., "Preparation of starch derivatives using reactive extrusion and evaluation of modified starches as shell materials for encapsulation of flavoring agents by spray drying", 2009, vol. 91, pp. 380-386, Journal of Food Engineering.

* cited by examiner

*Primary Examiner* — Snigdha Maewall

(74) *Attorney, Agent, or Firm* — B. Aaron Schulman, Esq.; Stites & Harbison, PLLC

(57) ABSTRACT

A high amylose starch-based capsule, which includes an oily core and a breakable shell composition surrounding the oily core. The breakable shell composition is a gelled matrix derived from a gellable mixture including a partially-gelatinized high amylose starch, a hydrocolloid gelling agent, and optionally a filler. The high amylose starch based capsule is breakable under the application of a sufficient amount of force. The high amylose starch-based capsules have sufficient rigidity to maintain their integrity while incorporating into bulk matrices, such as chewing gums or compressed tablet.

18 Claims, 5 Drawing Sheets

Example 8

Comparative Example 3

Comparative Example 4

A B C

HIGH AMYLOSE STARCH BASED CAPSULES AND METHOD OF MAKING SAME

FIELD OF THE INVENTION

The present invention relates to polysaccharide-based capsules, and more particularly to the development of high amylose starch and hydrocolloid based microcapsules.

BACKGROUND OF THE INVENTION

Gelatin capsules are used in a variety of pharmaceutical, nutraceutical, flavor, and fragrance applications. However, gelatin is typically an animal-based collagen derived from animal skin, tendon, ligaments, and/or bones, where the bulk of the commercially used gelatin is of bovine, porcine, chicken, or fish origin. Accordingly, a large number of vegetarians and persons of certain religious faiths avoid gelatin capsules due to its animal origin.

Substitutes for gelatin are known. For example, U.S. Patent Application Publication No. 2009/0208568 by Hannetel et al., describes a gellan based seamless breakable capsule and process for manufacturing thereof; Patent Cooperation Treaty (PCT) Published Application No. 2005/021635 by Voight et al., describes a covering material of agar and a hydrolyzed starch for seamless capsules; U.S. Pat. No. 5,795,590 by Kiefer et al., describes a seamless capsule, where the shell material is formed of a carbohydrate in glassy state; and U.S. Pat. No. 7,255,921 by Kamaguchi et al., describes a non-gelatin capsule film composition containing a starch hydrolyzate base having an average DE of less than 10 and an average molecular weight of not more than 30,000.

Although non-animal based film-forming agents exist, adaptation of these non-animal based, gelatin substitutes to seamless capsule formation processes is not always simple or straightforward. Moreover, the final physical or mechanical properties of the capsules need to match the requirements of their intended application, such as an ability to withstand processing forces (e.g., shear and/or compression) encountered during incorporation into consumer products, such as stick gum or compressed tablets. Accordingly, there is a need for new non-animal based capsules having desirable physical properties.

SUMMARY OF THE INVENTION

The present invention is premised on the realization that combining a partially-gelatinized high amylose starch with a hydrocolloid gelling agent provides a tunable and extrudable shell matrix for making a seamless capsule with unique rigidity properties.

Thus, in accordance with an embodiment of the present invention, a seamless breakable capsule is provided that comprises an oily core, and a shell composition surrounding the oily core. The shell composition comprises a gelled matrix comprising a mixture of a partially-gelatinized high amylose starch, a crosslinked hydrocolloid gelling agent, and optionally a filler.

In accordance with another embodiment of the present invention, a method of making the seamless breakable capsule is provided. The method comprises forming an external aqueous liquid phase comprising a gellable mixture comprising a partially-gelatinized high amylose starch, a hydrocolloid gelling agent, and water to form an external aqueous liquid phase. The partially-gelatinized high amylose starch is derived from a high amylose starch having been heated above its threshold gelatinization temperature (Gel T°) for a sufficient duration to effect a partial gelatinization. The external aqueous liquid phase is at a temperature above a gelling temperature of the gellable mixture. The method further includes coextruding the external aqueous liquid phase and an internal oily liquid phase comprising one or more flavor or fragrance compositions, thereby forming concentric drops, which upon cooling to a temperature below the gelling temperature of the gellable mixture forms the seamless breakable capsules comprising the oily core and the breakable shell composition surrounding the oily core. The breakable shell comprises a gelled matrix of the partially-gelatinized high amylose starch, the hydrocolloid gelling agent, and water.

The objects and advantages of the present invention will be further appreciated in light of the following detailed description and examples.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

DETAILED DESCRIPTION OF THE INVENTION

Figure 1:
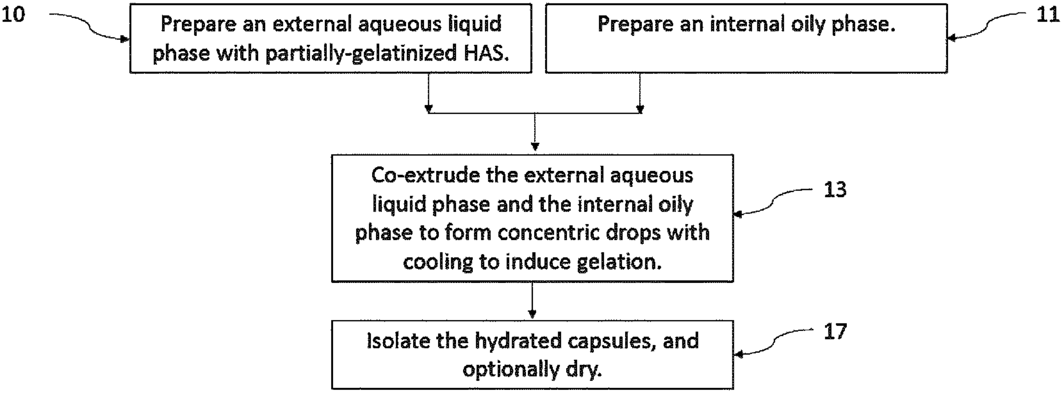
FIG. 1 is a flow chart showing an exemplary method for making the breakable seamless high amylose starch based capsules, in accordance with an embodiment of the present invention.

In accordance with embodiments of the present invention, a seamless, breakable, high amylose starch based capsule is provided that comprises an oily core and a breakable shell composition surrounding the oily core. As used herein, "breakable" capsule refers to a capsule as defined above, wherein the breakable shell can be ruptured under application of a sufficient amount of pressure, and thereby results in the release of the core. The breakable shell composition is derived from a gellable mixture comprising a partially-gelatinized high amylose starch and a hydrocolloid gelling agent. Advantageously, the high amylose starch based capsule is breakable under the application of a sufficient amount of force, but shows good resilience to mechanical and thermal stresses of a process for incorporating the capsules into a matrix.

As used herein, the term "capsule" means a delivery system of an oily core, which is enveloped by a breakable shell. Unless specified otherwise, the term "capsule" is not limited to any particular size of capsules, and may include macrocapsules, millicapsules, and microcapsules. For example, the capsules may have an average particle diameter from about 0.4 mm to about 8 mm; or about 0.5 mm to about 5 mm; or about 0.8 mm to 3 mm. It is of particular interest to obtain seamless capsules, as the breakability of a welded capsule (also designated in the prior art as softgel or hard capsule) may be influenced by the easy or unwanted rupture of the weld. In an embodiment, the capsules are spherical or substantially spherical. The capsules may be void of any dyes or colorants, or the capsules may be purposefully colored, such as having a colored oily core, a colored shell, or both.

Unless specified otherwise, the term "substantially" means±10% of a numerical value. And when referring to a sphere, it includes a distorted sphere where its shape ratio, which is a ratio of width/length measured by microscopy (SZX9 Olympus microscope with MICROVISION software), is at least 0.8 or greater.

As used herein "gellable mixture" means an aqueous mixture of a partially-gelatinized high amylose starch and a hydrocolloid gelling agent, alone or in combination with one or more other gelling agents, fillers, crosslinking agents, and/or additives, that is able to convert the aqueous phase from a flowable liquid to a solid or a gel.

As used herein, "crosslinked" means the linking of one section of the hydrocolloid gelling agent to another section in a gelled matrix. Depending on the chemical nature of the hydrocolloid gelling agent, the specific type of crosslinking may include one or more of ionic interactions, covalent bonding, inter- and intra-strand hydrogen bonding, or van der Waals forces. In an embodiment, the hydrocolloid gelling agent is a polysaccharide bearing carboxylic or carboxylate groups, where upon exposure to multivalent metal ions, such as $Ca^{2+}$, bridges are formed between inter- and intra-strand carboxylate groups in the gelled matrix.

According to the invention, the breakable shell composition surrounding the oily core is obtained by performing gelation of the gellable mixture described above. The thus obtained breakable shell composition comprises a gelled matrix comprising a mixture of a crosslinked hydrocolloid gelling agent, a partially-gelatinized high amylose starch, and optionally a filler.

The breakable capsules may be specifically designed to be incorporated into a variety of matrices, such as powders, gums, melts, gels, pastes, or liquid mediums containing water, to form various forms/shapes (e.g., tablets, rods, sheets, etc.) of consumer goods. The capsules may be suspended or mixed by any suitable means in order to bring a visual effect of homogeneous dispersion of the capsules in the matrices. Accordingly, to avoid undue and premature rupture of the breakable shell, the texture properties or rigidity of the capsule should be greater than that of the matrix into which the capsule is incorporated.

The texture of the capsules may be characterized using a TA.XTplus texture analyzer from Stable Micro System Ltd. (Surrey, UK) in compression mode with a 5 Kg load cell; Probe: P0.5—½ diameter DELRIN® cylinder; cylinder speed 0.5 mm/sec; resolution of 0.01 Kg. The capsule is positioned on the TA.XT plus device between the base and the probe. Vertical compressive force is then continuously applied onto one particle until the breakable shell ruptures and simultaneously the built-in gauge records force (in kilograms (Kg) or newton (N)) and position (in millimeter (mm)). Rupture of the capsule results in the release of the core.

The "force at break" or "hardness" is the maximum force applied at the very moment of the rupture of the capsule, (measured in Kg or N). "Deformation" is a ratio of the distance at break and the initial capsule size, where the "distance at break" (in mm) is the distance covered by the probe from the contact of the capsule until the capsule's breaking point, as measured using the TA.XTplus texture analyzer described above.

As used herein, "rigidity" defines the property of a solid body to resist deformation. Rigidity of the capsule may be characterized by its stiffness at break value and/or its Young's Modulus value. The "stiffness at break" (in Kg/mm or N/mm) is a ratio of the force at break and the distance at break. "Young's modulus" is defined as a ratio between the force and the deformation at the beginning of the compression (arbitrarily measured at 0.05 sec), in Kg or N. Both of these properties may be measured using the TA.XTplus texture analyzer as described above.

The polysaccharide-based breakable capsules of the present invention are useful for numerous applications, such as in oral care application (e.g., toothpaste, mouthwash, gums, etc.), in food applications (e.g., confectionary, dairy, bakery, savory, etc.), in nutraceutical applications, in pharmaceutical applications, pet food applications, or in home care products, fabric care products, personal care products (such as cosmetic products, shampoos, body washes, etc.). In order to withstand the processing stresses encountered during incorporation of the breakable capsules into the foregoing application, the dried breakable capsules are advantageously characterized by having a force at break in a range from 0.05 Kg to 3 Kg; a deformation ratio in a range from 0.1 to 0.9; a stiffness at break in a range from 0.2 Kg/mm to 5 Kg/mm; a Young's modulus of 0.2 Kg to 10 Kg; or a combination of two or more of the foregoing. For testing purposes, the dried breakable capsule has a water content of 10% or less (measured by Karl Fisher titration); a water activity of 0.8 or less; or both.

Breakable Shell

In accordance with embodiments of the present invention, the gellable mixture, which forms the breakable shell of the capsule comprises a partially-gelatinized high amylose starch. The partially-gelatinized high amylose starch may be derived from a high amylose starch (HAS) having an amylose content of at least 50 wt %, such as 55 wt %, 60 wt %, 65 wt %, 70 wt %, 75% wt %, 80 wt %, 90 wt %, 95 wt %, or in a range between any two of the foregoing, and wherein wt % is based on the dry weight of the starch. The HAS may have an amylose:amylopectin weight ratio of 50:50 to 95:5. For example, the HAS may have an amylose: amylopectin weight ratio of 50:50, 55:45, 60:40, 65:35, 70:30, 75:25, 80:20, 85:15, 90:10, or 95:5, or in a range between any two of the foregoing. According to an embodiment, the HAS has amylose:amylopectin ratio in a range from 60:40 to 90:10.

In accordance with an embodiment, the HAS may be a native starch or the HAS may be chemically modified so as to replace a portion of its hydroxyl functionalities with one or more functionalities selected from the group consisting of ethers, esters, and mixtures thereof. Substitution of hydroxyl functional groups by ether or ester functional groups causes disruptions among the intermolecular and intramolecular hydrogen bonds between the starch branches, thus decreasing the gelatinization temperature (relative to the native starch), and thus the retrogradation. Chemical modification of starches can also decrease crosslinking between the starch branches; crosslinking inhibits the swelling of the grains and the development of viscosity. Accordingly, the HAS may be chemically modified to include a hydroxyalkyl C2-C6 group or to include a carboxyl group. HAS that has been modified to include a hydroxyalkyl C2-C6 group forms an ether-modified high amylose starch. For example, treatment of HAS with propylene oxide yields hydroxypropylated HAS. On the other hand, HAS that has been chemically modified to include a carboxyl group, such as by reaction with a reactive acyl group (e.g., carboxylic anhydride), forms an ester modified high amylose starch. Thus treatment of HAS with acetic anhydride introduces acetyl groups to form acetylated HAS. In accordance with an embodiment, the high amylose starch comprises an acetyl-modified, high amylose starch, which may be obtained by reacting HAS with about 2 wt % to about 7 wt % acetic anhydride.

Non-limiting examples of HAS include, AMYLOMAIS M400G marketed by Roquette Freres Corporation; NYLON® VII, HI-MAIZE® 260, or CRISP FILM® from Ingredion Incorporated; or AMYLOGEL™30003, or BATTERCRISP® 90240 from CARGILL; or high amylose Native Pea Starch marketed by Emsland Starke GmbH; or combinations thereof.

Based on a total mass of the dry weight ingredients, the modified HAS is present in the gellable mixture in an amount in the range from 10 wt % to 90 wt %. For example, the modified HAS may be present in the gellable mixture at 10 wt %, 15 wt %, 20 wt %, 25 wt %, 30 wt %, 35 wt %, 40 wt %, 45 wt %, 50 wt %, 55 wt %, 60 wt %, 65 wt %, 70 wt %, 75 wt %, 80 wt %, 85 wt %, 90 wt %, or in a range between any two of the foregoing. In a preferred embodiment, the modified HAS is present in the gellable mixture in a range from 45 wt % to 85 wt %.

In accordance with embodiments of the present invention, the modified HAS is partially-gelatinized, but not completely gelatinized. Generally speaking, starch gelatinization is a process of breaking down the intermolecular bonds of starch molecules in the presence of water and heat, allowing the hydrogen bonding sites to engage more water. This irreversibly dissolves the starch granule in water, where the water acts as a plasticizer. Three main processes happen to the starch granule: granule swelling, crystal or double helical melting, and amylose leaching.

During heating, water is first absorbed in the amorphous space of starch, which leads to a swelling phenomenon. Water enters via amorphous regions between the tightly bound areas of double helical structures of amylopectin. At ambient temperatures, these crystalline regions do not allow water to enter. A sufficient application of heat causes such regions to become diffuse, the amylose chains begin to dissolve, to separate into an amorphous form and the number and size of crystalline regions decreases. Penetration of water thus increases the randomness in the starch granule structure, and causes swelling, eventually amylose molecules leach into the surrounding water and the granule structure partially disintegrates. Over the course of this process, the viscosity of the surrounding solution increases proportionally with increasing degree of gelatinization. Evaluation under polarized light microscopy of a fully gelatinized starch reveals its loss of birefringence and loss of its characteristic “Maltese cross” refraction pattern.

Thus, in an aspect of the present invention, the ability to adjust the viscosity (i.e., tunable viscosity) of the gellable mixture enables the tailoring of the extrusion mixture to match the requirements of the capsule forming equipment. Another aspect influenced by the degree of gelatinization is the physical strength properties of the shell matrix. For example, insufficient gelatinization of the HAS not only provides a low viscosity external extrusion mixture, but the capsules formed therefrom are characterized by lower force at break, stiffness at break, Young’s Modulus, and deformation ratio. Conversely, excessive or complete gelatinization of the HAS can create an excessively viscous gellable mixture, which may not be extrudable.

In accordance with an embodiment, heating an aqueous mixture comprising the ungelatinized HAS and water to a temperature above the starch’s threshold gelatinization temperature (Gel T°) initiates the gelatinization process. When the desired degree of partial-gelatinization is achieved, the aqueous mixture comprising partially gelatinized HAS is ready for the extrusion process. Alternatively, the temperature of the aqueous mixture may be lowered to a temperature that is near or below the starch’s threshold Gel T° in order to stabilize the HAS against further gelatinization, as well as stabilize the viscosity of the starch-containing solution. The lower temperature used for stabilizing the HAS against further gelatinization does not have to be below the starch’s threshold Gel T°, insofar as partial-gelatinization causes an increase in the subsequent gelatinization temperature of the resulting partially-gelatinized HAS. Accordingly, the lower, stabilizing temperature may be empirically derived. The partial gelatinization of the HAS may be conducted in water bath, a high shear mixer, pressurized reactor, jet cooker, or even using a twin screw extruder.

In an embodiment, the partially gelatinized high amylose starch is derived from a high amylose starch by heating the starch to a temperature above its threshold gelatinization temperature (Gel T°) for a sufficient duration to effect the desired extent of partial, yet incomplete, gelatinization.

In an embodiment, the partially gelatinized high amylose starch is characterized by a fractional Differential Scanning Calorimetric Gelatinization endotherm value, ($DSC_{gel}$) relative to a Differential Scanning Calorimetric Gelatinization endotherm value ($DSC_{gel-full}$) obtained from full-gelatinization of an ungelatinized sample of the high amylose starch, where the fractional $DSC_{gel}$ is in a range from 1/100 (1%) to 9/10 (90%) of the $DSC_{gel-full}$ of the ungelatinized sample. For example the fractional $DSC_{gel}$ may be 1%, 3%, 5%, 7%, 10%, 15%, 20%, 25%, 30%, 35%, 40%, 45%, 50%, 55%, 60%, 65%, 70%, 75%, 80%, 85%, 90% of the $DSC_{gel-full}$ of the ungelatinized sample, or within a range between any two of the foregoing. In another embodiment, the fractional $DSC_{gel}$ is in a range from 10% to 90% of the $DSC_{gel-full}$ obtained from full-gelatinization of an ungelatinized sample of the HAS, and thus the extent of gelatinization of the HAS may be 10% to 90% gelatinized.

In accordance with embodiments of the present invention, the gellable mixture further comprises a hydrocolloid gelling agent. In an embodiment, the hydrocolloid gelling agent comprises a polysaccharide bearing carboxylic or carboxylate groups. One especially suitable type of hydrocolloid gelling agent is a gellan gum, which can be used as the sole gelling agent in combination with the partially-gelatinized HAS. Exemplary gellan gums include, but are not limited to, low acyl gellan gum or deacylated gellan gum. In an embodiment, a preferred gellan gum is KELCOGEL® F gellan gum, commercially available from CP Kelco (San Diego, Calif.). Other suitable hydrocolloid gelling agents include alginates, pectin, agar-agar, gelifying starch, pullulan gum, xanthan gum, locust bean gum, carageenan, gum arabic, chitosan, or combinations thereof. Advantageously, gellan gum, pectin, agar-agar, gelifying starch, xanthan gum, locust bean gum, carageenan, alginates, and gum arabic are all non-animal based hydrocolloid gelling agents. However, gelatin, which can be derived from pork, beef, or fish, may also be used as the hydrocolloid gelling agent. Notably, non-animal based gelatin obtained by fermentation, such as Geltor® (by Geltor, Inc. of San Leandro, Calif., USA), may be considered. Additionally, chitosan derived from non-animals, such as mushroom chitosan & *Aspergillus niger* chitosan, is available from Chibio Biotech (Qingdao, China). However, to prepare an animal-free seamless capsule, the shell material of the breakable capsule should be void of any gelatin from animal by-product extraction.

Based on a total mass of the dry weight ingredients, the hydrocolloid gelling agent is present in the aqueous gellable mixture in an amount in the range from about 0.1 wt % to about 10 wt %. For example, the hydrocolloid gelling agent may be present in the gellable mixture in an amount of 0.1 wt %, 0.2 wt % 0.5 wt %, 0.8 wt %, 1.0 wt %, 1.5 wt % 1.8 wt %, 2.0 wt %, 2.5 wt %, 3.0 wt %, 3.5 wt %, 4.0 wt %, 4.5 wt %, 5.0 wt %, 7.5 wt %, 10 wt %, or in a range between any two of the foregoing. In an embodiment, the hydrocolloid gelling agent is present in the gellable mixture in a range from 2 wt % to 4 wt % and is selected from the group consisting of gellan, pectin, agar-agar, kappa-carageenan, gum arabic, and combinations thereof.

In an aspect of the invention, the gellable mixture may comprise a filler, which may be a material that can increase the percentage of dry material in the external liquid phase and thus in the obtained shell after co-extrusion. Increasing the dry material amount in a shell assists in solidifying the shell, as well as reducing the capule shell's wet thickness, and may improve drying of the concomitant hydrated (wet) shell. In an aspect, the filler may further act as an antiplasticizer making the breakable shell physically more resistant to deformation or breakage. In another aspect, the filler may further act as a plasticizer, which improves the processability of the gellable mixture and/or the flexibility of the gelled matrix. Exemplary fillers may include, but are not limited to starch derivatives such as dextrin, maltodextrin, innulin, sucrose, allulose, tagatose, cyclodextrin (alpha, beta, gamma, or modified cyclodexrin); cellulose derivatives such as microcrystalline cellulose (MCC) hydroxypropylmethylcellulose (HPMC), hydroxypropylcellulose (HPC), methylcellulose (MC), or carboxymethylcellulose (CMC); a polyvinyl alcohol; polyols with non-plasticizing properties; trehalose; erythritol; maltitol; mannitol; xylitol; glycerol; triacetine; a polyethylene glycol, polyalcohols with plasticizing or humectant properties; or combinations of two or more of the foregoing. Based on a total mass of the dry weight ingredients, the filler may be present in the gellable mixture in an amount in the range from about 0.1 to about 50 wt %. For example, the filler may be present in the gellable mixture in an amount of 0.1 wt %, 0.2 wt % 0.5 wt %, 0.8 wt %, 1.0 wt %, 1.5 wt % 2.0 wt %, 2.5 wt %, 3.0 wt %, 4.0 wt %, 5.0 wt %, 7.5 wt %, 10 wt %, 12.5 wt %, 15 wt %, 17.5 wt %, 20 wt %, 25 wt %, 35 wt %, 45 wt %, 50 wt %, or in a range between any two of the foregoing. In an embodiment, the filler is selected from sorbitol, glycerol, mannitol, sucrose, trehalose, propylene glycol, xylitol, erythritol, or combinations thereof, and may be present in the gellable mixture in a range from 5 wt % to 35 wt %.

Advantageously a coloring agent may be added to impart color to the breakable shell. Accordingly, the gellable mixture may further include one or more synthetic or natural coloring agents that is water soluble or capable of forming a water-stable suspension, e.g., emulsion. Exemplary coloring agents include, but are not limited to, pigments, titanium dioxide, iron oxides, carbon black, or any type of food, oral care, cosmetic or pharmaceutical pigments, such as Covasorb colors distributed by LCW. Natural coloring agents may also be obtained from Kancor Ingredients, Ltd (Kerala, India), including the natural pigments sold under Kancor's C-CAPTURE's colour stabilisation process.

In accordance with embodiments of the present invention, the gellable mixture is an aqueous mixture of the partially gelatinized high amylose starch, the hydrocolloid gelling agent, etc. in water. A typical weight ratio of water to the non-water (dry) ingredients is in a range from 1:1 to 20:1. Preferably, the water used for the external phase is purified water, such as distilled water, deionized water, or reverse osmosis water, but processing water is viable. If process water is utilized, a sequestering or complexing agent, which is capable of binding various types of cations, may be used to minimize undesirable or uncontrollable gelling during the coextrusion. More specifically, cations can affect the viscosity and gelling behavior of hydrocolloid gelling agents. The sequestering or complexing agent allows the entrapment of cations, such as alkali metals, alkaline earth metals, metals, or other cations, that could be present in one or more components of the gellable mixture, including the water. Thus, the use of the sequestering agent, preferably of a calcium ion sequestering agent, allows the gellan to be co-extruded without undesirable or uncontrollable gelling during the coextrusion. The amount of sequestering agent is at most 2 wt %, preferably at most 1 wt % and even more preferably at most 0.5 wt %, wherein wt % is based on the total dry weight of the shell ingredients. The sequestering agent may comprise a salt, preferably selected from the group comprising trisodium citrate, trisodium phosphate, tetrasodium pyrophosphate, sodium hexametaphosphate, and mixtures thereof.

In this particular embodiment using the sequestering agent, once the capsules are formed, the uncrosslinked shell of the formed capsules may be treated with a curing solution that comprises one or more crosslinking agents, for example a cation containing salt in the composition, which serves to enhance the setting ability of the gelling agents. Preferably, the salt comprises cations such as K+, Li+, Na+, NH4+, Ca2+, or Mg2+, etc. The amount of cations may be less than 5 wt %, such as less than 3 wt %, or less than 2 wt %, or less than 1 wt %. For example, the amount of cations may be in a range from 0.01 wt % to 5 wt %, or 0.1 wt % to 3 wt %, 0.5 wt % to 2 wt %, wherein wt % is based on the dry weight ingredients (e.g., HAS, hydrocolloid, etc.) in the hydrophilic external liquid phase.

Alternatively, the gellable mixture may further include the crosslinking agent. Exemplary crosslinking agents include a cation containing salt, such as salts comprising K+, Li+, Na+, NH4+, Ca2+, Mg2+, or combinations thereof. In accordance with an embodiment, the concentration of the crosslinking agent in the gellable mixture is 2 wt % or less, wherein wt % is based on the dry weight ingredients (e.g., HAS, hydrocolloid, etc.). For example, the crosslinking agent may be present in an amount of 0.1 wt %, 0.25 wt %, 0.5 wt %, 0.75 wt %, 0.9 wt %, 1.0 wt %, 1.1 wt %, 1.25 wt %, 1.50 wt %, 1.75 wt %, 1.9 wt %, 2.0 wt %, or in a range between any two of the foregoing.

In an embodiment, the crosslinked hydrocolloid gelling agent is obtained from a reaction between a hydrocolloid gelling agent selected from the group consisting of gellan, agar, kappa-carrageenan, alginates, and a combination thereof, and a cation of a cationic crosslinking agent.

In an embodiment, the cation is selected from the group consisting of $K^+$, $Li^+$, $Na^+$, $NH_4^+$, $Ca^{2+}$, $Mg^{2+}$, and a combination thereof.

The gellable mixture containing the crosslinking agent can also further include preservatives or bactericides such as benzoate, parabens, diols, cetylpyridinium chloride, diazolidinyl urea or any preservatives used for food, pharmaceutical or cosmetic products. Such preservatives may be useful if the seamless capsules are not sufficiently dried to inhibit growth of bacteria, molds, and yeasts (i.e., a water activity (Aw) equal to 0.6 or less). Water activity (Aw), as known by one skilled in the art, is sometimes referred to as "free" or "available" water in a system that is not bound to non-aqueous constituents. It can properly be defined as the partial vapor pressure of food moisture divided by the equilibrium vapor pressure of pure water at the same temperature. Water activity value can be measured using a LabMaster-aw by Novasina AG (Lachen, Switzerland), at 25° C.

In accordance with embodiments of the present invention, the dynamic viscosity of the gellable mixture, which is the external aqueous liquid phase in the coextrusion process, is in a range between from 5 to 350 mPa·sec, where the dynamic viscosity is determined at 70° C. using Thermo Scientific HAAKE™ MARS™ Rheometer; cone 35 mm/2°; shear rate from 0.01 to 1000 s-1; rotations in isothermal increments. For example, dynamic viscosity, measured at 70° C. and shear rate of 10 s-1, may be 5 mPa·sec, 10 mPa·sec, 15 mPa·sec, 20 mPa·sec, 25 mPa·sec, 30 mPa·sec, 50 mPa·sec, 70 mPa·sec, 90 mPa·sec, 100 mPa·sec, 120 mPa·sec, 140 mPa·sec, 150 mPa·sec, 175 mPa·sec, 200 mPa·sec, 225 mPa·sec, 250 mPa·sec, 275 mPa·sec, 300 mPa·sec, 350 mPa·sec, or in a range between any two of the foregoing. In an embodiment, the dynamic viscosity of the aqueous external phase, measured at 70° C. and shear rate of 10 s-1, is in a range from 50 to 140 mPa·sec. In an embodiment of the present invention, the dry ingredients (e.g., HAS, hydrocolloid, filler, etc.) may be all combined in water and heated together above the Gel T° of the HAS for a sufficient duration to effect a partial gelatinization and thereby achieve the desired dynamic viscosity.

Oily Core

In accordance with embodiments of the present invention, the oily core component comprises a solution, emulsion, or dispersion of one or more ingredients in a lipophilic liquid or low melting solid. Accordingly, the oily core may be a fluid or a low melting solid. However, the oily core component should be a fluid at its extrusion temperature to enable being pumped through the coextrusion nozzle. The oily core may comprise one or more of the following ingredients: flavors, fragrances, solvents, diluents, sweeteners, sensates, coloring agents, vitamins, vegetable extracts, thickening agents, weightening agents, pH-modifiers, antioxidants, emulsifiers, nutritionals, taste modifiers, and microorganisms such as probiotics. The core portion of the seamless breakable capsule may comprise a mixture of materials or products that are lipophilic or partially soluble in ethanol, or of molecules formulated as oil/water/oil emulsions. The core of a capsule according to embodiments of the invention may be of the order of 0.01 wt % to 90 wt %, such as in a range from 5 wt % to 75 wt %, wherein wt % is based on the total weight of the dried breakable capsule. For example, the core may be 5 wt %, 10 wt %, 15 wt %, 20 wt %, 25 wt %, 30 wt %, 35 wt %, 40 wt %, 50 wt %, 60 wt %, 70 wt %, 75 wt %, or in a range between any two of the foregoing.

In general, the oily core in the breakable capsule can be liquid, viscous, or even a low melting solid that is a liquid at its extrusion temperature. Thus, at its extrusion temperature, the core liquid has a dynamic viscosity of 1 to 500 mPa·sec, more preferably of 2 to 300 mPa·sec, even more preferably of 3 to 200 mPa·sec and most preferably 5 to 99 mPa·sec, where the dynamic viscosity may be determined at its extrusion temperature using Thermo Scientific HAAKE™ MARS™ Rheometer; cone 35 mm/2'; shear rate from 0.01 to 1000 s-1; rotations in isothermal increments. In an embodiment, the dynamic viscosity of the core liquid, measured at 25° C., and shear rate of 10 $s^{-1}$, is in a range from 2 to 300 mPa·sec, such as in a range from 3 to 200 mPa·sec. For example, dynamic viscosity of the core liquid may be 2 mPa·sec, 3 mPa·sec, 4 mPa·sec, 5 mPa·sec, 10 mPa·sec, 15 mPa·sec, 25 mPa·sec, 50 mPa·sec, 70 mPa·sec, 90 mPa·sec, 100 mPa·sec, 120 mPa·sec, 150 mPa·sec, 175 mPa·sec, 200 mPa·sec, 225 mPa·sec, 250 mPa·sec, 275 mPa·sec, 300 mPa·sec, or in a range between any two of the foregoing, measured at 25° C., and shear rate of 10 $s^{-1}$.

The oily core may include one or more hydrophobic oils or solvents conventionally used in the food, pharmaceutical, or cosmetic industries. The hydrophobic oils or solvents may be triglycerides, and in particular medium chain triglycerides (MCT), such as triglycerides of caprylic or capric acids, borage oil, vegetable oil, olive oil, sunflower oil, corn oil, pecan nut oil, pistachio kernel oil, rapeseed oil, rice germ oil, sesame seed oil, Soya oil, groundnut oil, hazelnut oil, walnut oil, coconut oil, pumpkin seed oil, linseed oil, maize germ oil, macadamia nut oil, almond oil, grapeseed oil, wheatgerm oil, thistle oil, castor oil, mineral oils, silicone oils; or fractionated coconut oils, which mainly have fatty acid residues with a length of between six and eight carbon atoms (C6- to C8-fatty acids). Diluent solvents may also be used, such as propylene glycol, diacetine (glycerine diacetate), triacetine (glycerine triacetate), benzyl alcohol, triethyl citrate, ethyl lactate, isopropanol, ethanol, glycerine, or combinations thereof.

For low melting substances, such as low melting waxes, fatty acids, triglycerides, polyglycerol esters, or the like, the melting point of the substance should be in a range from about room temperature to less than the co-extrusion temperature, such as in a range from 25° C. to 90° C. Nonlimiting examples of low melting substances include cocoa butter oil, coprah oil, bees waxes, castor oil, butter fat, or the like.

In an embodiment, the oily core comprises one or more flavor or fragrance compositions. The fragrance and flavoring substances may be mixed with one or more of the abovementioned oils or solvents and then used in accordance with the embodiments described herein. Preferably the flavor used according to the invention comprises lipophilic flavor substances. Lipophilic flavoring substances are preferably used in the context of the present invention and thus preferably used in the core of the capsule. They belong to various chemical groups, such as the group comprising hydrocarbons, aliphatic alcohols, aliphatic aldehydes and the acetals thereof, aliphatic ketones and oximes thereof, aliphatic sulfur-containing compounds, aliphatic nitriles, aliphatic carboxylic acids esters, acyclic terpene alcohols, acyclic terpene aldehydes and ketones, cyclic terpene alcohols, cyclic terpene aldehydes and ketones, cyclic alcohols, cycloaliphatic carboxylic acids, aromatic hydrocarbons, araliphatic alcohols, esters of araliphatic alcohols and aliphatic carboxylic acids, araliphatic ethers, aromatic and araliphatic aldehydes, aromatic and araliphatic ketones, aromatic and araliphatic carboxylic acids and the esters, nitrogenous aromatic compounds, phenols, phenyl ethers, phenyl esters heterocyclic compounds, lactones, and combinations thereof.

The lipophilic flavoring substances particularly preferably used in the context of the present invention have a log POW of higher than 1.0 are preferably selected from the group consisting of: acetophenone, allyl capronate, alpha-ionone, beta-ionone, anisaldehyde, anisyl acetate, anisyl formate, benzaldehyde, benzothiazole, benzyl acetate, benzyl alcohol, benzyl benzoate, beta-ionone, butyl butyrate, butyl caproate, butylidene phthalide, carvone, camphene, caryophyllene, cineol, cinnamyl acetate, citral, citronellol, citronellal, citronellyl acetate, cyclohexyl acetate, cymol, damascone, decalactone, dihydrocoumarin, dimethyl anthranilate, dimethyl anthranilate, dodecalactone, ethoxyethyl acetate, ethylbutyric acid, ethyl butyrate, ethyl caprinate, ethyl capronate, ethyl crotonate, ethyl furaneol, ethyl guajacol, ethyl isobutyrate, ethyl isovalerate, ethyl lactate, ethyl methyl butyrate, ethyl propionate, eucalyptol, eugenol, ethyl heptylate, 4-(p-hydroxyphenyl)-2-butanone, gamma-decalactone, geraniol, geranyl acetate, geranyl acetate, grapefruit aldehyde, methyl dihydrojasmonate (e.g. hedione), heliotropin, 2-heptanone, 3-heptanone, 4-heptanone, trans-2-heptenal, cis-4-heptenal, trans-2-hexenal, cis-3-hexenol, trans-2-hexenoic acid, trans-3-hexenoic acid, cis-2-hexenyl acetate, cis-3-hexenyl acetate, cis-3-hexenyl capronate, trans-2-hexenyl capronate, cis-3-hexenyl formate, cis-2-hexyl acetate, cis-3-hexyl acetate, trans-2-hexyl acetate, cis-3-hexyl formate, para-hydroxy benzyl acetone, isoamyl alcohol, isoamyl isovalerate, isobutyl butyrate, isobutyraldehyde, isoeugenol methyl ether, isopropylmethylthiazole, lauric acid, levulinic acid, linalool, linalool oxide, linalyl acetate, menthol, menthofuran, methyl anthranilate, methylbutanol, methylbutyric acid, 2-methylbutyl acetate, methyl capronate, methyl cinnamate, 5-methyl furfural, 3,2,2-methyl cyclopentenolone, 6,5,2-methyl heptenone, methyl dihydrojasmonate, methyl jasmonate, 2-methyl methyl butyrate, 2-methyl-2-pentenoic acid, methylthiobutyrate, 3,1-methylthiohexanol, 3-methylthiohexyl acetate, nerol, neryl acetate, trans,trans,2,4-nonadienal, 2,4-nonadienol, 2,6-nonadienol, 2,4-nonadienol, nootkatone, delta-octalactone, gamma-octalactone, 2-octanol, 3-octanol, 1,3-octenol, 1-octyl acetate, 3-octyl acetate, palmitic acid, paraldehyde, phellandrene, pentanedione, phenylethyl acetate, phenylethyl alcohol, phenylethyl alcohol, phenylethyl isovalerate, piperonal, propionaldehyde, propyl butyrate, pulegone, pulegol, sinensal, sulfurol, terpinene, terpineol, terpinolene, 8,3-thiomenthanone, 4,4,2-thiomethyl pentanone, thymol, delta-undecalactone, gamma-undecalactone, valencene, valeric acid, vanillin, acetoin, ethyl vanillin, ethyl vanillin isobutyrate, 2,5-dimethyl-4-hydroxy-3(2H)-furanone, homofuraneol, homofuronol, 5-ethyl-2-methyl-4-hydroxy-3(2H)-furanone, maltol and maltol derivatives, coumarin and coumarin derivatives, gamma-lactones, gamma-undecalactone, gamma-nonalactone, gamma-decalactone, delta-lactones, 4-methyl delta decalactone, massoia lactone, delta decalactone, tuberose lactone, methyl sorbate, divanillin, 4-hydroxy-2(or 5)-ethyl-5(or 2)-methyl-3(2H)furanone, 2-hydroxy-3-methyl-2-cyclopentenone, 3-hydroxy-4,5-dimethyl-2(5H)-furanone, acetic acid isoamyl ester, butyric acid ethyl ester, butyric acid-n-butyl ester, butyric acid isoamyl ester, 3-methylbutyric acid ethyl ester, n-hexanoic acid ethyl ester, n-hexanoic acid allyl ester, n-hexanoic acid-n-butyl ester, n-octanoic acid ethyl ester, ethyl-3-methyl-3-phenyl glycidate, ethyl-2-trans-4-cis-decadienoate, 4-(p-hydroxyphenyl)-2-butanone, 1,1-dimethoxy-2,2,5-trimethyl-4-hexane, 2,6-dimethyl-5-hepten-1-al and phenylacetaldehyde, 2-methyl-3-(methylthio)furan, 2-methyl-3-furanthiol, bis(2-methyl-3-furyl)disulfide, furfuryl mercaptan, methional, 2-acetyl-2-thiazoline, 3-mercapto-2-pentanone, 2,5-dimethyl-3-furanthiol, 2,4,5-trimethylthiazole, 2-acetylthiazole, 2,4-dimethyl-5-ethylthiazole, mercapto-3-methyl-1-butanol, 2-acetyl-1-pyrroline, 2-methyl-3-ethylpyrazine, 2-ethyl-3,5-dimethylpyrazine, 2-ethyl-3,6-dimethylpyrazine, 2,3-diethyl-5-methylpyrazine, 3-isopropyl-2-methoxypyrazine, 3-isobutyl-2-methoxypyrazine, 2-acetylpyrazine, 2-pentylpyridine, (E,E)-2,4-decadienal, (E,E)-2,4-nonadienal, (E)-2-octenal, (E)-2-nonenal, 2-undecenal, 12-methyltridecanal, 1-penten-3-one, 4-hydroxy-2,5-dimethyl-3(2H)-furanone, guajacol, 3-hydroxy-4,5-dimethyl-2(5H)-furanone, 3-hydroxy-4-methyl-5-ethyl-2(5H)-furanone, cinnamaldehyde, cinnamyl alcohol, methyl salicylate, isopulegol and further stereoisomers, enantiomers, positional isomers, diastereomers, cis/trans-isomers or epimers (not expressly mentioned) of these substances.

The core of the capsule may include natural or synthetic aromas and/or fragrances. Non-limiting examples of suitable fragrances are fruity, confectionery, floral, sweet, woody fragrances. Examples of suitable aromas are vanilla, coffee, chocolate, cinnamon, mint.

Non-limiting examples of suitable flavorings include peppermint oils, spearmint oils, eucalyptus oils, wintergreen oils, cinnamon oils, cassia oils, aniseed oils, bitter almond oils, clove oils, parsley seed oils, citrus oils, vanilla (extracts), fruity flavoring compositions having tastes oriented towards, for example, apple, pear, peach, grape, strawberry, raspberry, cherry, or pineapple are preferably used.

In addition, suitable individual substances as part of the flavorings are those having a cooling refreshing effect in the throat or in the oral or nasal cavity. Non-limiting examples include menthol, menthone, menthone glycerin acetate, menthyl acetate, menthyl methyl ether, methone acetals, menthol carbonates, menthyl lactate, menthyl succinates (such as monomenthyl succinate sold under the tradename PHYSCOOL®), substituted menthyl-3-carboxamides (for example menthyl-3-carboxylic acid-N-ethylamide), 2-isopropyl-N-2,3-trimethylbutanamide, substituted cyclohexane carboxamides, 3-menthoxypropane-1,2-diol, 2-hydroxyethyl menthyl carbonate, 2-hydroxypropyl menthyl carbonate, N-acetylglycine menthyl ester, isopulegol, hydroxycarboxylic acid menthyl esters (for example menthyl-3-hydroxybutyrate), 2-mercaptocyclodecanone, menthyl-2-pyrrolidin-5-onecarboxylate, 2,3-dihydroxy-p-menthane, 3,3,5-trimethylcyclohexanone glycerol ketal, 3-menthyl-3,6-di- and -tri-oxaalkanoates, 3-menthyl methoxyacetate, icilin, 1,8-cineol (eucalyptol), carvone, alpha-terpineol, thymol, methyl salicylate, 2'-hydroxypropiophenone, or a combination of two or more of the foregoing.

The oily core may also comprise one or more sweeteners, with the use of solubilizing agents, if appropriate. In general, applicable sweeteners for the core material include saccharin (optionally as sodium, potassium, or calcium salt), aspartame, cyclamate (optionally as sodium or calcium salt), acesulfam-K, neohesperidin dihydrochalcone. Furthermore, other sweeteners, such as steviols, stevioside, rebaudioside A, glycyrrhizin, osladin, brazzein, miraculin, pentadin, phyllodulcin, dihydrochalcone, arylureas, trisubstituted guanidines, glycyrrhizin, superaspartam, suosan, sucralose (trichlorogalactosesucrose or TGS), alitame, monellin, as well as other natural or artificial sweeteners may also be used.

If the core is to be colored, suitable colorants include oil soluble colors, oil stable suspensions, or W/O emulsions. Nonlimiting examples of colors suitable for imparting color to the core include lactoflavin (riboflavin), beta-carotene, riboflavin-5'-phosphate, alpha-carotene, gamma-carotene, cantaxanthin, erythrosine, curcumin, quinoline yellow, yellow orange S, tartrazine, bixin, norbixin (annatto, orlean), capsanthin, capsorubin, lycopene, beta-apo-8'-carotenal, beta-apo-8'-carotenic acid ethyl ester, xantophylls (flavoxanthin, lutein, cryptoxanthin, rubixanthin, violaxanthin, rodoxanthin), fast carmine (carminic acid, cochineal), azorubin, cochineal red A (Ponceau 4 R), beetroot red, betanin, anthocyanins, guaiazulene, amaranth, patent blue V, indigotine I (indigo-carmine), chlorophylls, copper compounds of chlorophylls, acid brilliant green BS (lissamine green), brilliant black BN, vegetable carbon, titanium dioxide, iron oxides and hydroxides, calcium carbonate, aluminum, silver, gold, pigment rubine BK (lithol rubine BK), methyl violet B, victoria blue R, victoria blue B, acilan brilliant blue FFR (brilliant wool blue FFR), naphthol green B, acilan fast green 10 G (alkali fast green 10 G), ceres yellow GRN, sudan blue II, ultramarine, phthalocyanine blue, phthalocayanine green, or fast acid violet R. Further naturally obtained colorants, such as those commercially available from Kancor Ingredients Ltd. (Kerala, India), e.g., anthocyanins, betatins, bixins, norbixins, carmines, carotenoids, chlorophyls, curcumins, spirulinas, etc., can be used for coloring purposes. The so-called aluminum lakes: FD & C Yellow 5 Lake, FD & C Blue 2 Lake, FD & C Blue 1 Lake, Tartrazine Lake, Quinoline Yellow Lake, FD & C Yellow 6 Lake, FD & C Red 40 Lake, Sunset Yellow Lake, Carmoisine Lake, Amaranth Lake, Ponceau 4R Lake, Erythrosyne Lake, Red 2G Lake, Allura Red Lake, Patent Blue V Lake, Indigo Carmine Lake, Brilliant Blue Lake, Brown HT Lake, Black PN Lake, Green S Lake, and mixtures thereof, may also be used.

Preferred antioxidants including substances which can reinforce an antioxidative effect are for example naturally occurring tocopherols and derivatives thereof (for example vitamin E-acetate), vitamin C and the salts or derivatives thereof (for example ascorbyl palmitate, Mg-ascorbyl phosphate, ascorbyl acetate), vitamin A and derivatives (vitamin A-palmitate), tocotrienols, flavonoids, alpha-hydroxy acids (for example citric acid, lactic acid, malic acid, tartaric acid) and the Na+, K+ and Ca+2 salts thereof, flavonoids, quercetin, phenolic benzylamines, propyl gallate, octyl gallate, dodecyl gallate, butylhydroxyanisol (BHA, E320), butyl hydroxytoluene (BHT, 2,6-di-tert-butyl-4-methyl-phenol, E321), lecithins, mono- and diglycerides of edible fatty acids esterified with citric acid, carotenoids, carotenes (for example α-carotene, β-carotene, lycopene) and derivatives thereof, phytic acid, lactoferrin, EDTA, EGTA), folic acid and derivatives thereof, ubiquinone and ubiquinol and derivatives thereof, ferulic acid and derivatives thereof, zinc and derivatives thereof (for example ZnO, ZnSO4), selenium and derivatives thereof (for example selenium methionine), orthophosphates and Na+, K+, and Ca+2 salts of monophosphoric acid as well as ingredients isolated from plants, extracts or fractions thereof, for example, from tea, green tea, algae, grape seeds, wheatgerm, camomile, rosemary and oregano.

The liquid or viscous core may contain substances or substance mixtures, which are active in nutritional physiology (nutraceuticals). Nutraceuticals in the meaning of the invention are substances or mixtures of substances which add a healthy benefit to the capsules according to the invention. Examples of such substances are especially vitamins, minerals, trace elements, micronutrients, probiotics, and/or antioxidants. The following might be named by way of example: panthenol, pantothenic acid, essential fatty acids, vitamin A and derivatives, carotenes, vitamin C (ascorbic acid), vitamin E (tocopherol) and derivatives, vitamins of the B and D series, such as vitamin B6 (nicotinamide), vitamin B12, vitamin D1, vitamin D3, vitamin F, folic acid, biotin, amino acids, oil soluble compounds of the elements magnesium, silicon, phosphorus, calcium, manganese, iron or copper, coenzyme Q10, unsaturated fatty acids, omega-3-fatty acids, polyunsaturated fatty acids, γ-linolenic acid, oleic acid, eicosapentaenoic acid, docosahexaenoic acid and derivatives thereof, bisabolene, chloramphenicol, caffeine, capsaicin, prostaglandins, thymol, camphor, γ-oryzanol, salmon oil, mustard oil such as allyl isothiocyanate (AITC), oil soluble or oil miscible extracts, concretes or residues of plant and animal origin, or probiotics such as Bifidobacterium-containing compositions.

Antitussive actives can be added and include e.g. dextromethorphan, chlophedianol, carbetapentane, caramiphen, nosciapine, diphenylhydramine, codeine, hydrocodone, hydromorphone, fominoben and benzonatate. Oral anesthetic actives can be added and include e.g. phenol, lidocaine, dyclonine, benzocaine, menthol, salicyl alcohol and hexylresorcinol.

The core may also comprise one or more weighting agents as used in aromatic emulsions, such as dammar gum, wood resins of the ester gum type, sucrose acetate isobutyrate (SAIB), or brominated vegetable oils. The function of these weighting agents is to adjust the density of the liquid core.

The core may also include one or more captive agents, including but not limited to, Betahydrane™ (3-benzyl-tetrahydropyran); Antillone™ (9-decen-2-one); Noreenal™ ((±)-6,8-Dimethylnon-7-enal); and/or Pescagreen™ (2-(2,4,4-trimethyl-cyclopentyl)-acrylonitrile).

Thus, in accordance with another embodiment of the invention and in reference to FIG. 1, a method for making a seamless breakable capsule is provided. The method comprises forming an external aqueous liquid phase comprising a gellable mixture that includes a partially-gelatinized high amylose starch, a hydrocolloid gelling agent, and water, wherein the partially-gelatinized high amylose starch is derived from a high amylose starch having been heated above its threshold gelatinization temperature (Gel T°) for a sufficient duration to effect a partial gelatinization, and wherein the external aqueous liquid phase is at a temperature above a gelling temperature of the gellable mixture; and co-extruding the external aqueous liquid phase and an internal oily liquid phase comprising one or more flavor or fragrance compositions, thereby forming concentric drops which upon cooling to a temperature below the gelling temperature of the gellable mixture forms the seamless breakable capsule comprising the oily core and the breakable shell composition surrounding the oily core.

Therefore, the method includes preparing an external aqueous (hydrophilic) liquid phase with a gellable mixture comprising the partially-gelatinized HAS and hydrocolloid gelling agent (step 10) and preparing an internal oily liquid phase (step 11). The method further includes co-extruding the external aqueous liquid phase and the internal oily liquid phase to form concentric drops with cooling to induce gelation (step 13), and finally isolating the hydrated seamless capsule, and optionally drying (step 17).

In an embodiment, forming the external aqueous liquid phase comprises heating the external aqueous liquid phase to a first temperature above the Gel T° of the high amylose starch for the sufficient duration to effect the partial gelatinization, followed by cooling the external aqueous liquid phase to a second temperature, which is below the Gel T° high amylose starch and above the gelling temperature of the gellable mixture.

In an embodiment, the external aqueous liquid phase further comprises a crosslinking agent, and wherein a dynamic viscosity of the external aqueous liquid phase is in a range from 5 mPa·sec to 350 mPa·sec, measured at 70° C. and shear rate of 10 $s^{-1}$.

In an example, the external aqueous liquid phase comprising the partially-gelatinized HAS may be prepared by adding the HAS to a mixture comprising hydrated gellan gum, sorbitol, and optionally any dyes, and then heating the mixture at a temperature above the threshold Gel T° of the specific HAS until the mixture reaches a dynamic viscosity in a range from about 5 mPa·sec to about 350 mPa·sec, where the dynamic viscosity is measured at 70° C. and shear rate 10 $s^{-1}$, as described above. In one example using acetylated HAS, the external aqueous liquid phase mixture was heated to a temperature between 75° C. to 82° C. for a duration of 5 to 30 minutes to affect a partial-gelatinization until a dynamic viscosity of about 100 mPa·sec (as measured at 70° C.) was achieved, and then cooled to about 70° C. prior to co-extrusion. Alternatively, the external aqueous liquid phase may be passed through a heat exchanger prior to entering the co-extrusion nozzle assembly, where the residence time and heat exchanger temperature are coordinated to effect the desired degree of gelatinization of the HAS, and optionally cooled prior to entering the co-extrusion nozzle assembly.

The co-extrusion step is a synchronous extrusion of two liquids: the external hydrophilic liquid phase, which becomes the shell; and the internal lipophilic liquid phase, which becomes the core, thereby forming a composite stream. In order to form the desired spherical seamless capsules, the coaxial composite stream of the fluid shell and fluid core materials may be induced to break into individual portions via vibrational, electrostatic, mechanical, or hydrodynamic methods. Application of a suitable vibration energy may be applied to the core component, the shell component, or the composite stream. One or more of a variety of vibration methods, including but not limited to, acoustic vibration, vibrating nozzle, piezoelectric vibrator, magnetic field, high frequency valve etc., breaks the composite jet into capsules having a size that is related to the vibration frequency and the flowrate of the composite stream. In accordance with an aspect of the invention, the vibration frequency may be in a range from 25 Hz to 6000 Hz. For example, the vibration frequency may be 25 Hz, 50 Hz, 75 Hz, 100 Hz, 200 Hz, 300 Hz, 400 Hz, 500 Hz, 600 Hz, 700 Hz, 800 Hz, 900 Hz, 1000 Hz, 1250 Hz, 1500 Hz, 1750 Hz, 2000 Hz, 2500 Hz, 3000 Hz, 3500 Hz, 4000 Hz, 4500 Hz, 5000 Hz, 5500 Hz, 6000 Hz, or in a range between any two of the foregoing. The co-extrusion can be performed using an apparatus and processes as described in expired U.S. Pat. No. 5,882,680 by Takei assigned to Freund Industrial Co., Ltd or U.S. Pat. No. 6,719,933 by Nakamura et al. assigned to Chugai.

In accordance with an embodiment, the co-extrusion is performed at a temperature less than about 70° C. Advantageously, the co-extrusion is performed at a temperature below 40° C. Of course, the acceptable temperature range for conducting the co-extrusion step is related to the gelling temperature of the gellable mixture, and should be conducted at a temperature at or sufficiently below the gelling temperature. In an embodiment, the co-extrusion is performed near room temperature, which means between 5° C. and 30° C., preferably 15° C. to 20° C. under atmospheric pressure. In another embodiment, the co-extrusion is performed at a temperature in a range from 3° C. to 20° C., such as at a temperature of 3° C., 5° C., 10° C., 15° C., 20° C., 25° C., or in a range between any two of the foregoing.

According to another embodiment of the invention, after the co-extrusion step (FIG. 1, step 13), the capsules may be further subjected to a solidification step, which is performed while maintaining the capsules cold in order to ensure sufficient gelling of the shell by contacting them with a cold bath, for example. Moreover, if the capsules are not already crosslinked (i.e., crosslinking agent not included in the gellable mixture prior to extrusion), the cold bath may comprise an aqueous solution or an emulsion containing a curing agent which comprises a cationic salt (e.g., alkali metals, alkaline earth metals, metals, or other cations), and optionally an acid. The effect of the immersion step is to wash out residual oil remaining at the periphery of the capsule, and to gradually strengthen the shell, notably through crosslinking, dehydration, and osmotic equilibrium. The curing agent preferably comprises multivalent metal ions, or a mixture of multivalent metal ions, such as calcium ions or magnesium ions. Thus, the cold bath may be a cold oil (e.g., MCT) or a cold emulsion. The bath temperature may be maintained at a value less than the gelation temperature of the gellable mixture. For example, the bath temperature may be below 18° C., such as about 2° C. to about 10° C., or about 4° C. to about 6° C.

The aqueous solution or emulsion containing the curing agent is preferably a multivalent metal salt solution, preferably alkaline earth metal salt containing calcium or magnesium salts, more preferably, calcium dichloride, calcium carbonate, calcium sulfate or dicalcium phosphate. This solution may be the aqueous phase of an oil-in-water emulsion. This solution can be at a temperature comprised between 2° C. and room temperature. Advantageously, the aqueous solution containing the curing agent is maintained under acid conditions of pH, and preferably at a pH less than 5, more preferably from 2 to 4. According to an embodiment of the invention, the aqueous solution or emulsion containing a curing agent is a 1 wt % calcium chloride solution having a pH of 3 to 4.

If the cold bath is an oil or if the capsules are extruded with a submerged (in chilled oil) co-extrusion nozzle, the crosslinked capsules may be centrifuged in order to remove the surplus oil. Additionally or alternatively, the crosslinked capsules may be washed with organic solvent (such as acetone, ethyl acetate, ethanol, petroleum ether, etc.) to remove the surplus oil. Processing aids, such as silica may also be used to keep the capsules from clumping together. Sieving techniques may be used to remove excess silica.

The crosslinked capsules may be optionally dried in a current or air at controlled temperature and humidity, or under vacuum. The relative humidity of the drying air may be in a range from 20% to 60%, preferably 30 to 50%; the temperature of the drying air is in a range from 15° C. to 60° C., preferably 35° C. to 45° C. According to an embodiment of the invention, after immersion, the capsules can be dried under the same conditions as mentioned above. According to another embodiment of the invention, after immersion, the capsules are not dried. For measuring the water content of the dried capsules, a Karl Fisher titrator (Mettler model DL18) is suitable.

In an embodiment, the method further comprises drying the seamless breakable capsule to a water content of 10 wt % or less, a water activity of 0.8 or less, or both, wherein a texture of the dried seamless breakable capsule is characterized by at least one of a force at break in a range from 0.05 Kg to 3 Kg; a deformation ratio in a range from 0.1 to 0.9; a stiffness at break in a range from 0.2 Kg/mm to 5 Kg/mm; a Young's modulus in a range from 0.2 Kg to 10 Kg; or a combination of any two or more of the foregoing.

According to yet another embodiment of the invention, the process comprises the steps of co-extruding the above mentioned external and internal liquid phases, solidifying and/or gelling the surface of the shell by keeping the capsule under cold conditions, as explained herein above, optionally centrifuging, optionally washing the so-obtained capsules with an organic solvent, immersing the resulting capsules into an aqueous solution containing a curing agent, and optionally drying the capsules. In another example, the uncrosslinked capsules are directly dipped into a bath, under cold conditions, containing the divalent alkaline earth metal salts, preferably calcium or magnesium salts, more preferably, calcium dichloride, calcium sulfate or dicalcium phosphate. As used herein in this embodiment, "cold" means any temperature below 18° C., such as in a temperature between 2° C. to 10° C., or 4° C. to 6° C.

According to another embodiment of the invention, the solidifying/gelling/curing steps can be gathered into a single step. For example, the external aqueous phase may comprise the partially-gelatinized HAS, the hydrocolloid gelling agent, the crosslinking agent, an optional filler, an optional plasticizer, and water, and the resultant extruded seamless capsule already has a crosslinked breakable shell.

The capsules manufactured through the process according to an embodiment of the invention are characterized as spherical or substantially spherical, substantially homogeneous in size, and may have an average particle diameter from about 0.4 mm to about 8 mm. Advantageously, the shell thickness of the capsule is 10 to 500 microns, preferably 30 to 300 microns, more preferably 90 to 130 microns, where the shell thickness is measured on a dried capsule using scanning electron microscopy techniques described below. Of course, the shell thickness may vary based on the diameter of the breakable capsule. A ratio of the diameter of the capsule to the thickness of the shell is in the range of 100:1 to 1:1, preferably in a range from 30:1 to 5:1.

The sphericity of the dried capsules may be expressed as a shape ratio (I/L), which is a ratio of width/length measured by microscopy (SZX9 Olympus microscope with MICROVISION software). In an embodiment, the sphericity of the dried capsules are in range from about 0.8:1 to 1:1, such as 0.8 or more, 0.85 or more, 0.9 or more, 0.95 or more, or in a range between any two of the foregoing.

The shell of a breakable capsule according to the invention represents by weight 8 wt % to 80 wt % of the total weight of the dried capsule, preferably 10 wt % to 75 wt %, more preferably 40 wt % to 70 wt %. The amount of water present in the shell may range from 1 wt % (for a dried capsule) to 90 wt % (for a wet (hydrated) shell after co-extrusion), preferably 5 wt % to 40 wt %, with the capsule remaining breakable even at the higher percentages.

The total weight of the capsule of the invention depends on variety of factors, including the capsule's diameter and the amount of core contained within the shell, and its final moisture content. According to an embodiment of the invention, the total weight of the wet capsule is within the range of 0.2 to 400 mg. According to an embodiment of the invention, the total weight of the dried capsule is within the range of 0.1 to 150 mg, preferably 0.2 to 20 mg, more preferably 0.5 to 10 mg.

According to a preferred embodiment, a dried breakable capsule according to the invention is characterized as having one or more of the following texture properties: a force at break in a range from 0.05 Kg to 3 Kg; a deformation ratio in a range from 0.1 to 0.9; a stiffness at break in a range from 0.2 Kg/mm to 5 Kg/mm; or a Young's modulus in a range from 0.2 Kg to 10 Kg. As noted above, the dried breakable capsule has a moisture content of 10% or less, a water activity (Aw) of 0.8 or less, or both. In another embodiment, the dried breakable capsule is characterized by having a force at break in a range from 0.05 Kg to 3 Kg; a deformation ratio in a range from 0.1 to 0.9; a stiffness at break in a range from 0.2 Kg/mm to 5 Kg/mm; and a Young's modulus in a range from 0.2 Kg to 10 Kg. In yet another embodiment, the dried breakable capsule is characterized by having a force at break in a range from 0.2 Kg to 2 Kg; a deformation ratio in a range from 0.1 to 0.5; a stiffness at break in a range from 1 Kg/mm to 5 Kg/mm; and a Young's modulus in a range from 1 Kg to 5 Kg.

The capsules according to the invention can be included in various products, such as food products, oral care products, nutraceutical products, pharmaceutical products, pet food product, cleaning products and cosmetic products. The invention thus relates to a food product such as confectionary including breakable capsules according to the invention; an oral care product including breakable capsules according to the invention, a toothpaste including breakable capsules according to the invention; a pharmaceutical product including breakable capsules according to the invention; or a fragrance including breakable capsules according to the invention. Such capsules can also be coated or colored through additional process to modify its surface properties.

When incorporating the inventive capsules into bulk matrices, such as confectionary formulations like a chewing gum matrix or a compressed tablet matrix, it is advantageous that the capsules have favorable rigidity properties. Thus, in accordance with an embodiment, the rigid breakable capsule is charactized by having a stiffness at break in a range from 0.2 Kg/mm to 5 Kg/mm; a Young's modulus in a range from 0.2 Kg to 10 Kg, or both. In accordance with another embodiment, the dried breakable capsule is characterized by having a stiffness at break in a range from 1 Kg/mm to 3 Kg/mm; a Young's modulus in a range from 1 Kg to 5 Kg; or both.

The invention is hereunder illustrated by the following examples, which should not be considered as limiting the scope of the invention.

EXAMPLES: General procedure for preparing external aqueous phase: A measured quantity of osmosis water is heated and a hydrocolloid gelling agent mixed therein until complete dissolution is achieved. The high amylose starch (HAS), and optionally filler(s), crosslinking agents, and/or other additives, are added and the resultant mixture is stirred at a sufficient temperature to affect a controlled partial gelatinization of the HAS. After achieving the desired extent of gelatinization, the temperature of the mixture is then lowered to stabilize the mixture until it is coextruded to make the breakable capsule. The holding temperature is near or below the threshold gelatinization temperature (Gel° T) of the HAS, yet above the gelling or gelification temperature of the gellable mixture. The formulations for the external aqueous liquid phase for examples (Ex.1-7) and comparative examples (C.1-2) are shown in Table 1. Examples 1-7 include a partially-gelatinized HAS (denoted "<full" in Table 1), whereas Comparative Examples C. 1 and 2 utilize a fully-gelatinized HAS (denoted "=full" in Table 1). Attempts to extrude an external aqueous phase of a gellable mixture containing ungelatinized HAS (at 50° C.) failed to produce seamless capsules.

TABLE 1

| Components for the external aqueous phase | | | | | | | | | | |
|---|---|---|---|---|---|---|---|---|---|---|
| Ingredient | | Ex. 1 | Ex. 2 | Ex. 3 | Ex. 4 | Ex. 5 | Ex. 6 | Ex. 7 | C. 1 | C. 2 |
| Water | Osmosis $H_2O$ | 85.45 | | 86.65 | 85.45 | 84.45 | 85.45 | 84.7 | 84.45 | 85.45 |
| Hydrocolloid | Gellan[a] | 0.5 | | 0.5 | 0.5 | 0.5 | 0.5 | | 0.5 | 0.5 |
| Hydrocolloid | Carrageenan[b] | | | | | | | 1.25 | | |
| HAS | Low acyl HAS[c] | 10 | | 8 | 10 | 10 | 10 | | | 10 |
| HAS | Native HAS[d] | | 10 | | | | | 10 | | |
| HAS | Pre-gel HAS[e] | | | | | | | | 10 | |
| Gelatinization | | <full | <full | <full | <full | <full | <full | <full | =full | =full |
| Colorant | Carmine P-WS E-120[f] | | | 0.05 | | | | | | |
| Colorant | VEGEX NC 2C WS MCT[g] | | | 0.75 | | | | | | |
| Filler/plasticizer | Sorbitol[h] | 4 | 4 | 4 | 4 | 4 | | 4 | 4 | 4 |
| Filler/plasticizer | Glycerin[i] | | | | | | 4 | | | |
| Crosslinking agent | $CaCl_2$ 50% (aq) | 0.05 | 0.05 | 0.05 | 0.05 | 0.05 | 0.05 | 0.05 | 0.05 | 0.05 |
| Rheology of external phase | Viscosity** (mPas) | 59 | 9 | 142 | 138 | 108 | 100 | 224 | 38 | 96 |
| | Gelling temp (° C.) | 40 | 37 | 40 | * | * | 42 | 34 | 38 | 51 |

[a]Gellan - KELCOGEL ® F/CP KELCO;
[b]GENuGEL ® Carrageenan CHP-1F/CP KELKO;
[c]AMYLO M400G/ROQUETTE FRERES SA;
[d]HYLON VII/INGREDION;
[e]Pre-gelatinized LAB RS720/ROQUETTE FRERES SA;
[f]Carmine 52% P-WS E-120/SENSIENT;
[g]VEGEX NC 2C WS MCT/CHR HANSEN;
[h]C*SORBIDEX P 16619/CARGILL HAUBOURDIN S.A.S;
[i]GLYCERINE CODEX/INTERCHIMIE;
* not measured;
**at 70° C. and shear rate 10 s−1.

General procedure for preparing internal oily phase: A desired quantity of flavor ingredients are mixed with a measured quantity of fluid core material. For example, powdered or crystalline flavor ingredients may be melted or dissolve in a quantity of essential oil (EO) or medium chain triglyceride (MCT), followed by addition of the liquid flavor ingredients. And then the remaining quantity of EO or MCT is added. The final formulation should be a stable liquid at the extrusion temperature. The formulations for the core material of examples (Ex.1-7) and comparative examples (C.1-2) are shown in Table 2.

TABLE 2

| Components for the internal oily phase | | | | | | | | | |
|---|---|---|---|---|---|---|---|---|---|
| | Ex. 1 | Ex. 2 | Ex. 3 | Ex. 4 | Ex. 5 | Ex. 6 | Ex. 7 | Comp. 1 | Comp. 2 |
| MCT | 56 | 56 | 71 | 56 | 56 | 56 | 56 | 56 | 56 |
| Spearmint Flavor | 44 | 44 | | 44 | 44 | 44 | 44 | 44 | 44 |
| Citrus Flavor | | | 26 | | | | | | |
| Viscosity (mPa · sec)** | 6.3 | 6.3 | 9.4 | 6.3 | 6.3 | 6.3 | 6.3 | 6.3 | 6.3 |

**at 25° C. and shear rate 10 s−1.

General procedure for preparing capsules: The external aqueous phase of the gellable mixture and the internal oily phase of the core are individually pumped through a submerged coaxial nozzle assembly thereby forming a concentric composite stream that partitions into discreet concentric drops due to the vibrational energy imparted thereto. The discharge of the coaxial nozzle is submerged into a carrier fluid (e.g., a medium chain triglyceride (MCT)), which is at a temperature lower than the gelation temperature of the gellable mixture. The gellable mixture is thereby cooled and forms the hydrated shell portion of the capsule. The capsules thus formed are then aged at 4° C. for about an hour, collected and centrifuged to remove a majority of the residual MCT. The centrifuged capsules and a portion of dessicating agent (e.g., silica or starch) are mixed and then dried in a fluid bed dryer with air at 42° C. until the capsule bed reaches approximately 32° C. The dried capsules are collected and sieved.

The dried, breakable capsules prepared in accordance with embodiments of the present invention have a homogeneous and smooth appearance, and are spherical or substantially spherical (as measured by the average ratio between the width and the length of the microcapsules). In an embodiment, the dried, breakable capsules also possess a rigid texture profile. Table 3 lists the dried capsule texture properties.

TABLE 3

| Characteristics of the dried seamless, breakable capsules | | | | | | | | | | |
|---|---|---|---|---|---|---|---|---|---|---|
| | | Ex. 1 | Ex. 2 | Ex. 3 | Ex. 4 | Ex. 5 | Ex. 6 | Ex. 7 | C. 1 | C. 2 |
| $A_w$ | | 0.43 | 0.55 | 0.46 | 0.86 | 0.56 | 0.61 | 0.26 | 0.38 | 0.70 |
| Texture | Force at break (Kg) | 0.26 | 0.41 | 0.38 | 0.20 | 1.18 | 0.24 | 0.237 | 0.20 | 0.38 |
| | Std. Dev. | 0.05 | 0.57 | 0.06 | 0.06 | 0.19 | 0.05 | 0.048 | 0.10 | 0.08 |
| | Deformation | 0.13 | 0.14 | 0.17 | 0.17 | 0.12 | 0.25 | 0.196 | 0.27 | 0.32 |
| | Stiffness at break (Kg/mm) | 2.12 | 2.61 | 2.11 | 1.37 | 2.96 | 0.71 | 1.721 | 0.68 | 1.21 |
| | Young modulus (Kg) | 1.97 | 1.76 | 1.71 | 1.27 | 9.66 | 1.14 | 1.325 | 0.76 | 1.57 |
| Particle dimensions | Diameter (mm) | 1.08 | 1.08 | 1.08 | 0.91 | 3.52 | 1.43 | 1.061 | 0.96 | 1.10 |
| | Std. Dev. | 0.05 | 0.07 | 0.04 | 0.29 | 0.02 | 0.04 | 0.055 | 0.05 | 0.05 |
| | Shape ratio (I/L) | 0.92 | 0.93 | 0.92 | 0.90 | 0.96 | 0.97 | 0.906 | 0.85 | 0.87 |
| | Std. Dev. | 0.03 | 0.04 | 0.02 | 0.03 | 0.01 | 0.03 | 0.026 | 0.08 | 0.07 |

**All measurements taken @ 25° C.

Figure 2:
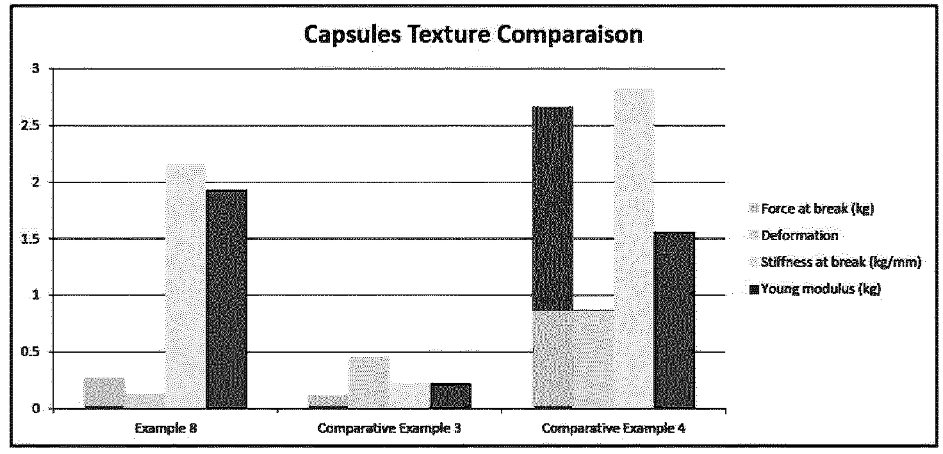
FIG. 2 is bar graph showing capsule texture analysis data obtained from TA.XTplus texture analyzer from Stable Micro System Ltd. for a 1 mm high amylose starch based capsule and two comparative examples.

FIG. 2 is a bar graph showing a comparison of capsule texture analysis data between a 1 mm inventive seamless capsule (example 10; partially-gelatinized HAS and hydrocolloid gelling agent), and comparative capsules, a) gellan/sorbitol seamless capsule (comparative example 3), and b) a gelatin seamless capsule (comparative example 4). Formulations for the components of the external aqueous phase (shell matrix) of example 8 and comparative examples 3-4 are shown in Table 4 below. The inventive capsules have a rigidity (stiffness at break and/or Young's modulus) that is similar to that of the gelatin capsule, and a force at break and deformation ratio similar to that of the gellan/sorbitol capsule (see Table 5). The texture profile under compression of the inventive seamless capsules show a high initial slope, similar to that of the gelatin capsule. Thus, even if the breaking force of an inventive capsule (e.g., example 8) remains lower than that of the gelatin capsule (e.g., comparative example 4), the stiffness (characterized by the Young's modulus and/or stiffness at break) is comparable to that of the gelatin and much higher than that of the other gelatin-free alternative (e.g., comparative example 3).

TABLE 4

| Components for the external aqueous phase | | | | |
|---|---|---|---|---|
| Ingredient | | Example 8 | Comp. Example 3 | Comp. Example 4 |
| Water | Osmosis $H_2O$ | 85.41 | 82.95 | 77.50 |
| Hydrocolloid | Gellan[a] | 0.5 | 1.0 | |
| Hydrocolloid | Carrageenan[b] | | 1.0 | |
| Hydrocolloid | Gelatin[c] | | | 19.8 |
| HAS | Low acyl HAS[d] | 10 | — | — |
| Gelatinization | | <full | n/a | n/a |
| Colorant | E133 BRILLIANT BLUE FCF 85% | 0.04 | | |
| Filler/plasticizer | Sorbitol[e] | 4 | 8 | 2.7 |
| Filler/plasticizer | Dextrin[f] | | 8 | |
| Crosslinking agent | $CaCl_2$ 50% (aq) | 0.05 | 0.05 | n/a |

TABLE 4-continued

| Components for the external aqueous phase | | | | |
|---|---|---|---|---|
| Ingredient | | Example 8 | Comp. Example 3 | Comp. Example 4 |
| Rheology of external phase | Viscosity** (mPas) | 177 | 109 | 76 |
| | Gelling temp (° C.) | 50 | 54 | 28 |

[a]Gellan - KELCOGEL ® F/CP KELCO;
[b]GENuGEL ® Carrageenan CHP-1F/CP KELKO;
[c]GELIKO ® K FG 250/30 BOVIN HIDES BRAZIL/Gelita Deutchland;
[d]AMYLO M400G/ROQUETTE FRERES SA;
[d]HYLON VII/INGREDION;
[e]C*SORBIDEX P 16619/CARGILL HAUBOURDIN S.A.S; CRISTAL TEX ™ 648/INGREDION;
**at 70° C. and shear rate 10 s−1.

TABLE 5

| Characteristics of dried seamless, breakable capsules | | | | |
|---|---|---|---|---|
| | | Example 8 | Comp. Example 3 | Comp. Example 4 |
| $A_w$ | | 0.58 | 0.64 | 0.48 |
| Texture | Force at break (Kg) | 0.27 | 0.11 | 2.67 |
| | Std. Dev. | 0.08 | 0.03 | 0.97 |
| | Deformation | 0.128 | 0.46 | 0.88 |
| | Stiffness at break (Kg/mm) | 2.17 | 0.23 | 2.83 |
| | Young modulus (Kg) | 1.93 | 0.22 | 1.56 |
| Particle dimensions | Diameter (mm) | 1.08 | 1.12 | 1.08 |
| | Std. Dev. | 0.05 | 0.08 | 0.05 |
| | Shape ratio (I/L) | 0.91 | 0.91 | 0.99 |
| | Std. Dev. | 0.03 | 0.04 | 0.05 |

**All measurements taken @ 25° C.

Figure 3:
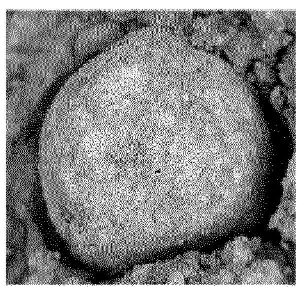
FIG. 3 shows scanning electron micrographs of the high amylose starch based capsule and the two comparative examples shown in FIG. 2 after having been incorporated into a chewing gum matrix.
Figure 3:
Figure 3:
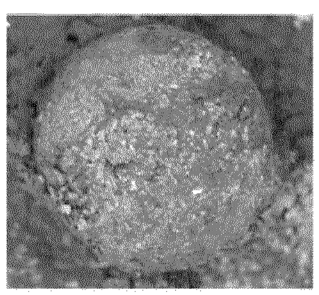
Figure 3:

Samples of each capsule type were manually incorporated into a chewing gum matrix comprising xylitol, gum base, maltitol syrup, mannitol, glycerin, aspartame, acesulfame K, and citric acid, which had been premixed in a Z-mixer Type LKB from Herman-Linden at 40° C., and then subsequently formed into a thin sheet. For capsules possessing good rigidity characteristics, when a constraint is applied it is the matrix that deforms first and not the capsules. FIG. 3 includes SEM micrographs of the three different capsule types (see Tables 4 and 5) after being incorporated into the exemplary chewing gum confectionary matrix. Prior to scanning, the samples were coated using a Quorum Technologies SC7620 Sputter Coater to deposit a thin conductive metal coating; SEM scans were taken using desktop Scanning Electron Microscope—Phenom Pro with standard sample holder. As shown in the left and right micrographs, the inventive capsules and gelatin capsules remain smooth and intact, unlike the center micrograph, which shows the gellan/dextrin capsule deformed, wilted, and presumably ruptured during exposure to the processing conditions.

Figure 4:
FIG. 4 is a scanning electron micrograph of the high amylose starch based capsule in a chewing gum matrix showing its spherical shape and intact shell.
Figure 5:
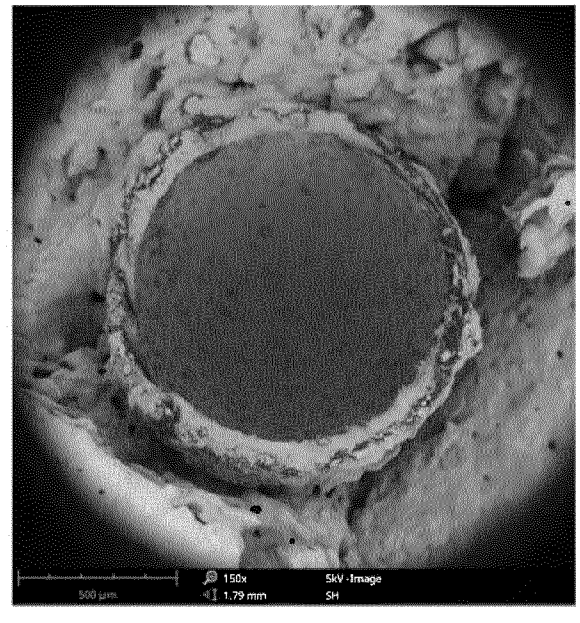
FIG. 5 is a scanning electron micrograph of a fractured inventive high amylose starch based capsule in accordance with an embodiment of the present invention, in a chewing gum matrix showing a homogenous shell thickness.

FIG. 4 is a scanning electron micrograph of the polysaccharide-based capsule in a compressed tablet matrix showing its intact shell and retained spherical shape. For the compressed chewing gum tablet, the matrix comprises gum base magnesium stearate, silica, aspartame, acesulfame-K, and citric acid were premixed prior to incorporating the capsules. Tablets were formed with a RIVA PICCOLA tablet machine. And in FIG. 5, a scanning electron micrograph is shown of an inventive polysaccharide-based capsule in a gum matrix with a cut shell, and which shows that the thickness of the capsule shell is substantially uniform about its circumference.

During mastication, the consumer perceives the rupture of the capsules in the chewing gum matrix, with a sensation of slamming and a slight sound. Thus the inventive capsules provide a crisp perception in the mouth, and an aromatic performance in application equivalent to gelatin capsules. Accordingly, the inventive capsules provide an alternative to animal-based gelatin seamless capsules, yet still retain the advantages provided.

Figure 6:
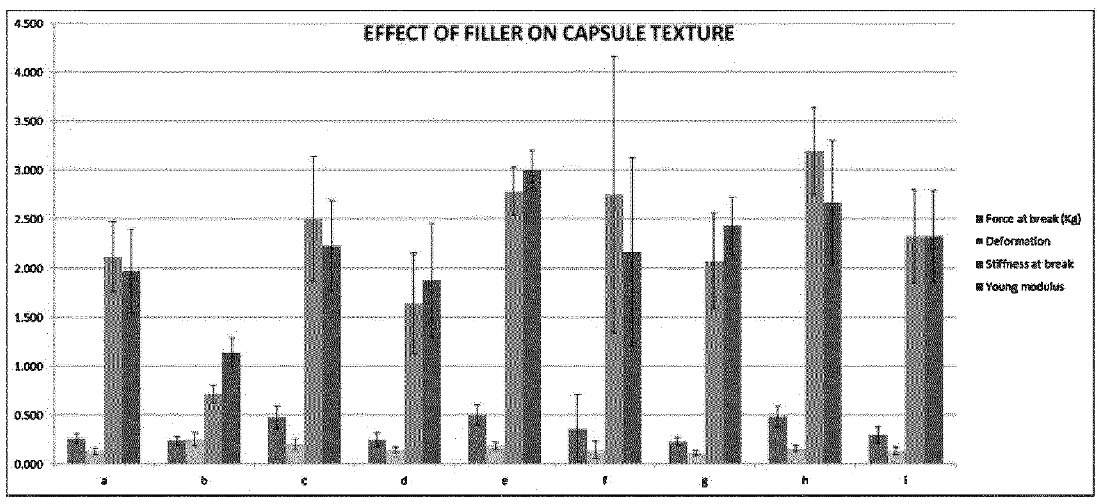
FIG. 6 is a bar graph showing capsule texture analysis data obtained from TA.XTplus texture analyzer from Stable Micro System Ltd. for a plurality of 1 mm high amylose starch based capsules incorporating different fillers, in accordance with an embodiment of the present invention.

An additional study was performed to assess the effect of various fillers on the texture (see Table 6) of the breakable capsule. Each formulation and its process of manufacture was based on examples 1 and 6 (see Table 1), which only varied the filler type to assess a) sorbitol in comparison to b) glycerol. Similarly examples 9-15 varied only the filler type: c) mannitol, d) sucrose, e) trehalose, f) maltitol, g) propylene glycol, h) xylitol, and i) erythritol. FIG. 6 shows a bar graph comparing capsule texture analysis data for 1 mm inventive seamless capsules (example 10; partially-gelatinized HAS and hydrocolloid gelling agent), with the various filler types. As evidence by the data, the identity of the filler had some effect on the absolute value of the texture properties. Notably, each of the tested plasticizers provided a seamless breakable capsule with rigidity properties suitable for confectionary applications.

TABLE 6

Effects of variations in plasticizer type

| | | Ex. 1[a] | Ex. 6[b] | Ex. 9[c] | Ex. 10[d] | Ex. 11[e] | Ex. 12[f] | Ex. 13[g] | Ex. 14[h] | Ex. 15[i] |
|---|---|---|---|---|---|---|---|---|---|---|
| Rheology | Viscosity** (mPa · S) | 59 | 100 | 40 | * | 34 | 27 | 40 | 40 | 40 |
| | Gelling temp (° C.) | * | 42 | 40 | * | 40 | 38 | 40 | 40 | 40 |
| $A_w$ | | 0.43 | 0.61 | 0.35 | 0.68 | 0.31 | 0.52 | 0.65 | 0.39 | 0.57 |
| Texture | Force at break (Kg) | 0.26 | 0.24 | 0.48 | 0.25 | 0.50 | 0.36 | 0.23 | 0.48 | 0.30 |
| | Std. Dev. | 0.05 | 0.05 | 0.11 | 0.07 | 0.10 | 0.34 | 0.04 | 0.11 | 0.09 |
| | Deformation | 0.13 | 0.14 | 0.17 | 0.17 | 0.12 | 0.25 | 0.196 | 0.27 | 0.32 |
| | Stiffness at break (Kg/mm) | 2.12 | 0.71 | 2.51 | 1.64 | 2.78 | 2.75 | 2.08 | 3.20 | 2.33 |
| | Young modulus (Kg) | 1.97 | 1.14 | 2.22 | 1.88 | 2.99 | 2.16 | 2.43 | 2.67 | 2.32 |
| Particle dimensions | Diameter (mm) | 1.08 | 1.22 | 1.03 | 1.04 | 1.02 | 0.99 | 1.02 | 1.03 | 1.03 |
| | Std. Dev. | 0.05 | 0.02 | 0.03 | 0.06 | 0.04 | 0.06 | 0.07 | 0.04 | 0.07 |
| | Shape ratio (l/L) | 0.92 | 0.93 | 0.91 | 0.92 | 0.92 | 0.89 | 0.91 | 0.92 | 0.92 |
| | Std. Dev. | 0.03 | 0.03 | 0.03 | 0.02 | 0.03 | 0.04 | 0.03 | 0.03 | 0.02 |

[a]Sorbitol C*SORBIDEX P 16619/CARGILL HAUBOURDIN S.A.S;
[b]GLYCERINE CODEX/INTERCHIMIE;
[c]D-mannitol/O'LAUGHLIN Corp. Ltd.;
[d]Sucrose/SAINT LOUIS SUCRE SA;
[e]Trehalose/Quimdis Aromatique;
[f]Maltitol SWEETPEARL P200/ROQUETTE,
[g]Propylene glycol DOW 162301-PG/UNIVAR;
[h]Xylitol XYLISORB 700-XYLITOL E967/ROQUETTE FRERES SA; and
[i]ERYLITE ®/JUNGBUNZLAUER;
* not measured;
**at 70° C. and shear rate 10 s−1; Aw, Texture, and particle dimensions measured at 25° C.

Figure 7:
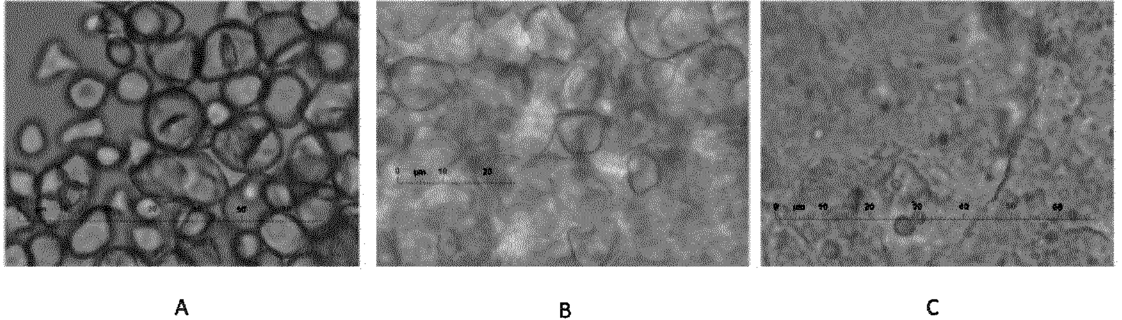
FIGS. 7A-7C show microscope photographs of iodine-stained high amylose starch (HAS) samples at varying degrees of gelatinization (A) untreated HAS granules; (B) inventive high amylose starch based capsule shell with partially-gelatinized HAS; and (C) comparative capsule with fully gelatinized HAS.
Figure 8:
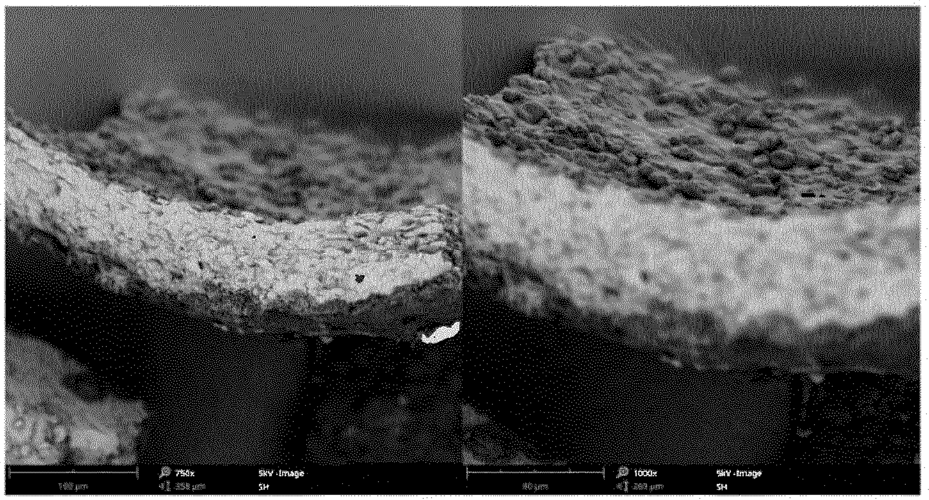
FIG. 8 is a scanning electron micrograph of a cut inventive high amylose starch based capsule, in accordance with an embodiment of the present invention, showing partially-gelatinized HAS granules within the shell matrix (left) and on the inner surface (right)

Regarding FIG. 7, several microscope photographs of iodine-stained high amylose starch (HAS) samples show the physical characteristics of varying degrees of gelatinization for (A) untreated HAS granules; (B) an inventive capsule shell with partially-gelatinized HAS; and (C) a comparative capsule with fully gelatinized HAS. FIG. 8 shows scanning electron micrographs of a cut section of the capsule shell shows partially gelatinized HAS granules embedded within the shell's gelled matrix (left) and its inner surface (right), thus providing evidence of its incomplete gelatinization.

Figure 9:
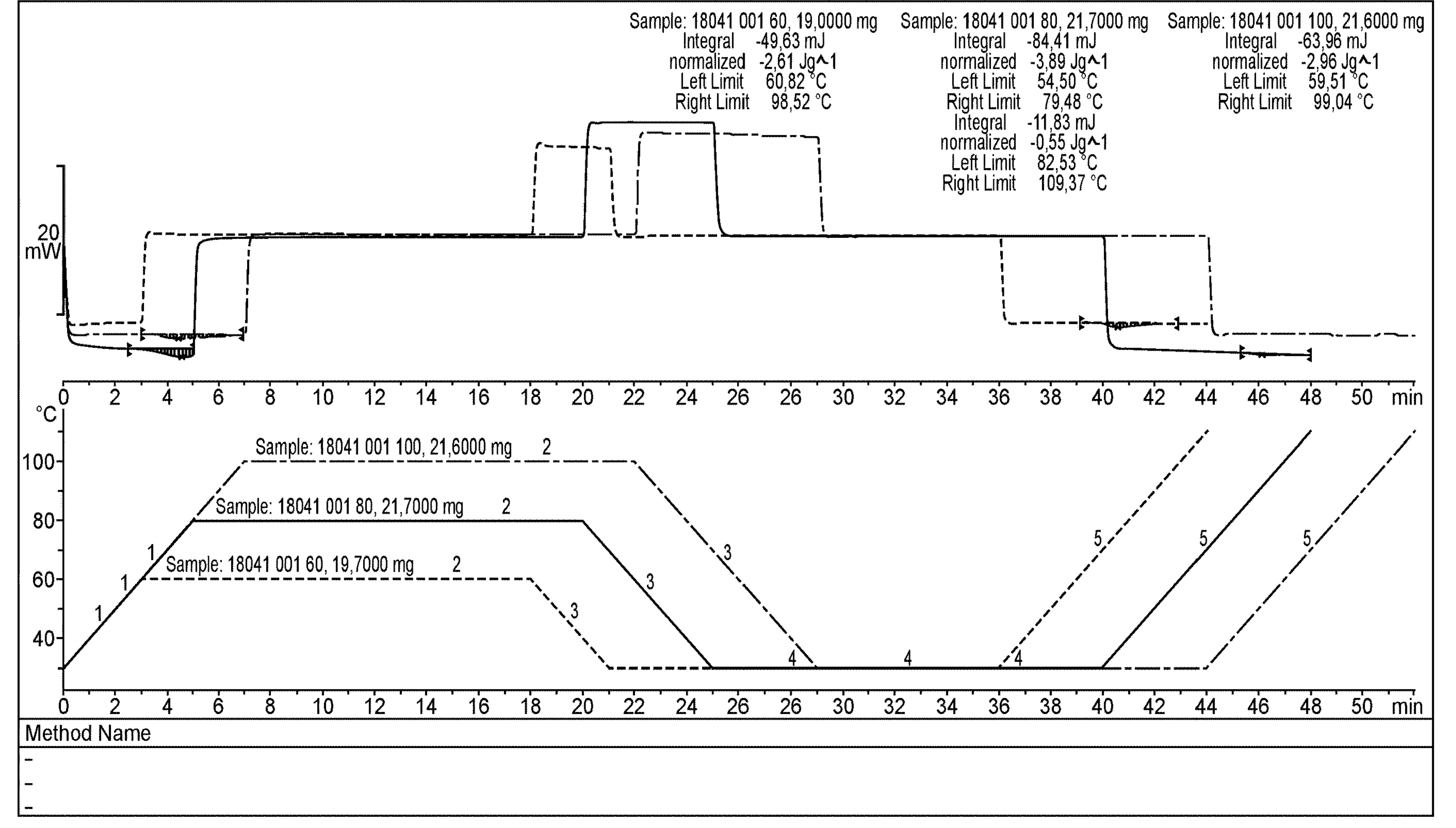
FIG. 9 is a Differential Scanning Calorimetric graph showing three samples of HAS heat-treated at 60° C., 80° C., and 100° C., (subsequently cooled to 30° C., and reheated to 110° C.) and their respective gelatinization-related endotherms.

In order to further verify partial yet incomplete gelatinization of the HAS, differential scanning Calorimetry (DSC) analysis was performed on ungelatinized, partially gelatinized, and fully gelatinized samples of HAS. Samples of 20 wt % AMYLO M400 Roquette starch in osmosis water were sealed in aluminum thermal analysis crucibles. The DSC analysis protocol entailed heating from 30° C. to 110° C. at a rate of 10° C./min. DSC analysis revealed an endothermic profile for the gelatinization of the AMYLO M400 Roquette starch initiating near 65° C. (i.e., its threshold Gel T°) and ending around 88° C., with its peak near 75° C. Other samples were subjected to a DSC heat treatment at specific temperatures (50° C., 60° C., 70° C., 75° C., 78° C., 80° C., 90° C., and 100° C.) by heating at a rate of 10° C./min to the target temperature and held there for 15 minutes before cooling back to 30° C. at 10° C./min. During the heat treatment, where the cooking is at or above the threshold Gel T°, an endotherm was observed indicating the occurrence of some degree of gelatinization. The heated-treated samples were stabilized at 30° C., and then analyzed under the DSC protocol used for the unheated sample (i.e., heating from 30° C. to 110° C. at a rate of 10° C./min). Three DSC heat treatment trials run at 60° C., 80° C., and 100° C. are shown in FIG. 9. The sample heat-treated at 60° C. for 15 minutes showed no endotherm during that period, thus indicating no gelatinization had occurred at 60° C. In contrast, the sample heat-treated at 100° C. for 15 minutes showed a significant endotherm during that heat treatment period. However, no endotherm was observed in the subsequent DSC analysis protocol from 30° C. to 110° C., thus indicating complete or full gelatinization had occurred at 100° C. The heat-treated sample at 80° C. for 15 minutes showed an endotherm during that period, as well as another endotherm in the subsequent DSC analysis protocol from 30° C. to 110° C. Accordingly, the heat-treatment at 80° C. only affected a partial gelatinization of the HAS.

Thus, in accordance with embodiments of the present invention, the partially gelatinized HAS may be characterized by its fractional Differential Scanning Calorimetric Gelatinization ($DSC_{gel}$) endotherm, relative to the $DSC_{gel-full}$ endotherm obtained from full-gelatinization of an ungelatinized sample of the HAS, where the fractional $DSC_{gel}$ endotherm is in a range from 1/100 (1%) to 9/10 (90%) of the $DSC_{gel-full}$ endotherm value obtained from full-gelatinization of an ungelatinized sample. For example the fractional $DSC_{gel}$ may be 1%, 3%, 5%, 7%, 10%, 15%, 20%, 25%, 30%, 35%, 40%, 45%, 50%, 55%, 60%, 65%, 70%, 75%, 80%, 85%, 90% of the $DSC_{gel-full}$ endotherm value of the ungelatinized sample, or within a range between any two of the foregoing. For example, complete gelatinization of an ungelatinized sample of AMYLO M400 provided a $DSC_{gel-full}$ of 10.15 Joules/gram starch, whereas the partially gelatinized sample of AMYLO M400, previously heat treated at 75° C. for only 15 minutes, provided a fractional $DSC_{gel}$ of 3.0 Joules/gram starch, and thus this sample was approximately 70% gelatinized (or 30% ungelatinized).

A sample of dried capsules was analyzed under the DSC protocol described above. A sealed aluminum crucible was prepared containing 4 to 5 integral (non-crushed) capsules (about 3.5 mg) with a drop of osmotic water (about 15 mg to about 25 mg total weight). The inventive high amylose starch based capsules were prepared in accordance with the principles and processes described herein, and more specifically the external aqueous liquid phase containing the HAS was preheated to a temperature between 75 to 78° C. for about 15 minutes and then cooled to about 70° C. prior to co-extruding with the oily phase. The endotherm of the dried capsules substantially corresponded to the observed endotherm for the HAS sample that was heat-treated at 75° C.

While the present invention was illustrated by the description of one or more embodiments thereof, and while embodiments have been described in considerable detail, they are not intended to restrict or in any way limit the scope of the appended claims to such detail. Additional advantages and modification will readily appear to those skilled in the art. The invention in its broader aspects is therefore not limited to the specific details, representative product and method, and illustrative examples shown and described. For example, partially gelatinized HAS may also be utilized to form films, softgel capsules, etc., whereby varying the extent of gelatinization allows tunability of the resulting film properties. Accordingly, departures may be made from such details without departing from the scope of the general inventive concept embraced by the following claims.

The invention claimed is:

1. A seamless breakable capsule comprising:

(a) an oily core; and (b) a breakable shell composition surrounding the oily core, the shell composition comprising a gelled matrix comprising a mixture of a crosslinked hydrocolloid gelling agent, and a partially-gelatinized high amylose starch;

wherein the partially-gelatinized high amylose starch is derived from a high amylose starch comprising at least 50 wt % amylose; and wherein the capsule has a particle diameter from about 0.4 mm to about 8 mm.

2. The capsule according to claim 1, wherein the oily core comprises one or more flavor or fragrance compositions.

3. The capsule according to claim 1, wherein the partially-gelatinized high amylose starch is derived from the high amylose starch by heating the high amylose starch to a temperature above its threshold gelatinization temperature (Gel T°) for a sufficient duration to effect a partial gelatinization.

4. The capsule according to claim 1, wherein the high amylose starch comprises at least 60 wt % amylose, or at least 80 wt % amylose.

5. The capsule according to claim 1, wherein the high amylose starch is chemically modified so as to replace a portion of its hydroxyl functionalities with one or more functionalities selected from the group consisting of ethers, esters, and mixtures thereof.

6. The capsule according to claim 1, wherein the high amylose starch is chemically modified to include a hydroxyalkyl C2-C6 group or to include a carboxyl group.

7. The capsule according to claim 1, wherein the high amylose starch is chemically modified to include an acetyl group.

8. The capsule according to claim 1, wherein the partially-gelatinized high amylose starch is characterized by a fractional Differential Scanning calorimetric Gelatinization endotherm (DSCgel), relative to a Differential Scanning calorimetric Gelatinization endotherm value (DSCgel-full) obtained from full-gelatinization of an ungelatinized sample of the high amylose starch, and wherein the fractional DSCgel is in a range from 1/100 to 9/10 of the DSCgel-full of the ungelatinized sample.

9. The capsule according to claim 1, wherein the crosslinked hydrocolloid gelling agent is obtained from a reaction between a hydrocolloid gelling agent selected from the group consisting of gellan, agar, kappa-carrageenan, alginates, and a combination thereof, with a cation of a cationic crosslinking agent.

10. The capsule according to claim 9, wherein the cation of the crosslinking agent is selected from the group consisting of K<+>, Li<+>, Na<+>, NH4<+>, Ca<+>, Mg<+>, and a combination thereof.

11. The capsule according to claim 1, wherein the capsule is a dried capsule, and wherein a texture of the dried capsule is characterized by a parameter selected from the group consisting of:

a force at break in a range from 0.05 Kg to 3 Kg;

a deformation ratio in a range from 0.1 to 0.9;

a stiffness at break in a range from 0.2 Kg/mm to 5 Kg/mm;

a Young's modulus in a range from 0.2 Kg to 10 Kg; and a combination of any two or more of the foregoing.

12. The capsule according to claim 1, wherein the capsule is a dried capsule, and wherein a texture of the dried capsule is characterized by:

a force at break in a range from 0.05 Kg to 3 Kg;

a deformation ratio in a range from 0.1 to 0.9;

a stiffness at break in a range from 0.2 Kg/mm to 5 Kg/mm; and a Young's modulus in a range from 0.2 Kg to 10 Kg.

13. The capsule according to claim 1, wherein the capsule is a dried capsule, and wherein a texture of the dried capsule is characterized by:

a force at break in a range from 0.2 Kg to 2 Kg;

a deformation ratio in a range from 0.1 to 0.5;

a stiffness at break in a range from 1 Kg/mm to 3 Kg/mm;

a Young's modulus in a range from 1 Kg to 5 Kg; or a combination of any two or more of the foregoing.

14. A method of making the seamless breakable capsule of claim 1, the method comprising:

forming an external aqueous liquid phase comprising a gellable mixture that includes a partially-gelatinized high amylose starch, a hydrocolloid gelling agent, and water, wherein the partially-gelatinized high amylose starch is derived from a high amylose starch having been heated above its threshold gelatinization temperature (Gel T°) for a sufficient duration to effect a partial gelatinization, and wherein the external aqueous liquid phase is at a temperature above a gelling temperature of the gellable mixture; and co-extruding the external aqueous liquid phase and an internal oily liquid phase comprising one or more flavor or fragrance compositions, thereby forming concentric drops which upon cooling to a temperature below the gelling temperature of the gellable mixture forms the seamless breakable capsule comprising the oily core and the breakable shell composition surrounding the oily core.

15. The method according to claim 14, wherein forming the external aqueous liquid phase comprises heating the external aqueous liquid phase to a first temperature above the Gel T° of the high amylose starch for the sufficient duration to affect the partial gelatinization, followed by cooling the external aqueous liquid phase to a second temperature, which is below the Gel T° high amylose starch and above the gelling temperature of the gellable mixture.

16. The method according to claim 14, wherein the external aqueous liquid phase further comprises a crosslinking agent, and wherein a dynamic viscosity of the external aqueous liquid phase is in a range from 5 mPa·sec to 350 mPa·sec, measured at 70° C.

17. The method according to claim 14, further comprising:

drying the seamless breakable capsule to a water content of 10 wt % or less, a water activity of 0.8 or less, or both, wherein a texture of the dried seamless breakable capsule is characterized by a parameter selected from the group consisting of:

a force at break in a range from 0.05 Kg to 3 Kg;

a deformation ratio in a range from 0.1 to 0.9;

a stiffness at break in a range from 0.2 Kg/mm to 5 Kg/mm;

a Young's modulus in a range from 0.2 Kg to 10 Kg; and a combination of any two or more of the foregoing.

18. The capsule according to claim 1, further comprising a filler.

* * * * *